(12) United States Patent
Radhakrishnan et al.

(10) Patent No.: US 11,671,829 B1
(45) Date of Patent: Jun. 6, 2023

(54) SERVER-BASED ASSOCIATION OF A USER DEVICE WITH A USER ACCOUNT

(71) Applicant: Amazon Technologies, Inc., Seattle, WA (US)

(72) Inventors: Rashmesh Radhakrishnan, Snohomish, WA (US); Abraham Martin Passaglia, Seattle, WA (US); Quentin N. Robinson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 244 days.

(21) Appl. No.: 16/703,439

(22) Filed: Dec. 4, 2019

Related U.S. Application Data

(60) Provisional application No. 62/904,941, filed on Sep. 24, 2019.

(51) Int. Cl.
*H04L 29/06* (2006.01)
*H04W 12/069* (2021.01)
*H04L 9/40* (2022.01)
*H04W 76/14* (2018.01)

(52) U.S. Cl.
CPC ....... *H04W 12/069* (2021.01); *H04L 63/0807* (2013.01); *H04L 63/0815* (2013.01); *H04L 63/0823* (2013.01); *H04L 63/0853* (2013.01); *H04W 76/14* (2018.02)

(58) Field of Classification Search
CPC ................ H04W 12/069; H04W 76/14; H04L 63/0807; H04L 63/0815; H04L 63/0823; H04L 63/0853
See application file for complete search history.

(56) References Cited

U.S. PATENT DOCUMENTS

| 10,547,613 | B1 * | 1/2020 | Roths | H04L 9/0844 |
| 2013/0086377 | A1 * | 4/2013 | Cilfone | G06F 11/1076 713/156 |
| 2014/0075513 | A1 * | 3/2014 | Trammel | H04L 63/0807 726/4 |
| 2016/0259932 | A1 * | 9/2016 | Lakshmanan | H04W 4/029 |
| 2016/0294828 | A1 * | 10/2016 | Zakaria | H04W 12/06 |

(Continued)

FOREIGN PATENT DOCUMENTS

WO WO-2017120243 A1 * 7/2017 ............. H04L 63/02

*Primary Examiner* — Harunur Rashid
(74) *Attorney, Agent, or Firm* — Kilpatrick Townsend & Stockton LLP

(57) ABSTRACT

Techniques for a server-based association of a device with a user account are described. In an example, a computer system receives, from a second device, first data of a first device. The first data indicates a request for a first association between the first device and a user account. The computer system determines that the first data is valid based on second data associated with the first device. Based on the first data being valid, the computer system sends, to the second device, third data to initiate a user authentication. The computer system then receives, from the second device, a user identifier based on the user authentication and determines that a second association between the user identifier and the user account already exists. The computer system causes the first association between the first device and the user account to be generated based on the second association.

20 Claims, 15 Drawing Sheets

(56) References Cited

U.S. PATENT DOCUMENTS

| | | | |
|---|---|---|---|
| 2018/0007060 A1* | 1/2018 | Leblang | G06F 21/35 |
| 2018/0034772 A1* | 2/2018 | Sun | H04W 12/71 |
| 2018/0109650 A1* | 4/2018 | Berdy | G06F 8/65 |
| 2019/0052683 A1* | 2/2019 | Logue | H04L 12/2823 |

* cited by examiner

SERVER-BASED ASSOCIATION OF A USER DEVICE WITH A USER ACCOUNT

CROSS-REFERENCE TO RELATED APPLICATIONS

This application claims the benefit of and priority to U.S. Provisional Application No. 62/904,941, filed Sep. 24, 2019, the content of which is hereby incorporated by reference in its entirety for all purposes.

BACKGROUND

Most computing devices, such as consumer electronics, support wireless connectivity. Typically, a computing device connects to a wireless access point that provides access to a data network. In many cases, functionalities of the device through the data network become available only after the device is registered with a user account. Typically, the registration process involves many user input steps to identify the device and the user account.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a server-based association of a device with a user account. In the interest of clarity, such a device is referred to herein as a provisionee. Once the association is complete, functionalities of the provisionee become available through a data network. In an example, the data network includes one or more devices. At least one of such devices has a data connection with a remote computer system. In the interest of clarity, such a device is referred to herein as a provisioner. The provisionee establishes a data connection with the provisioner. Upon a determination that the provisionee has not be associated with a user account yet, a request is sent from the provisionee to the provisioner that, in turn, sends the request or information from the request to the remote computer system. The remote computer system validates the request based on information about the provisionee and sends a response to the provisioner. The response can trigger the provisioner to initiate a user authentication. Upon a determination of a successful user authentication, the computer system associates the provisioner with the user account.

Figure 1:
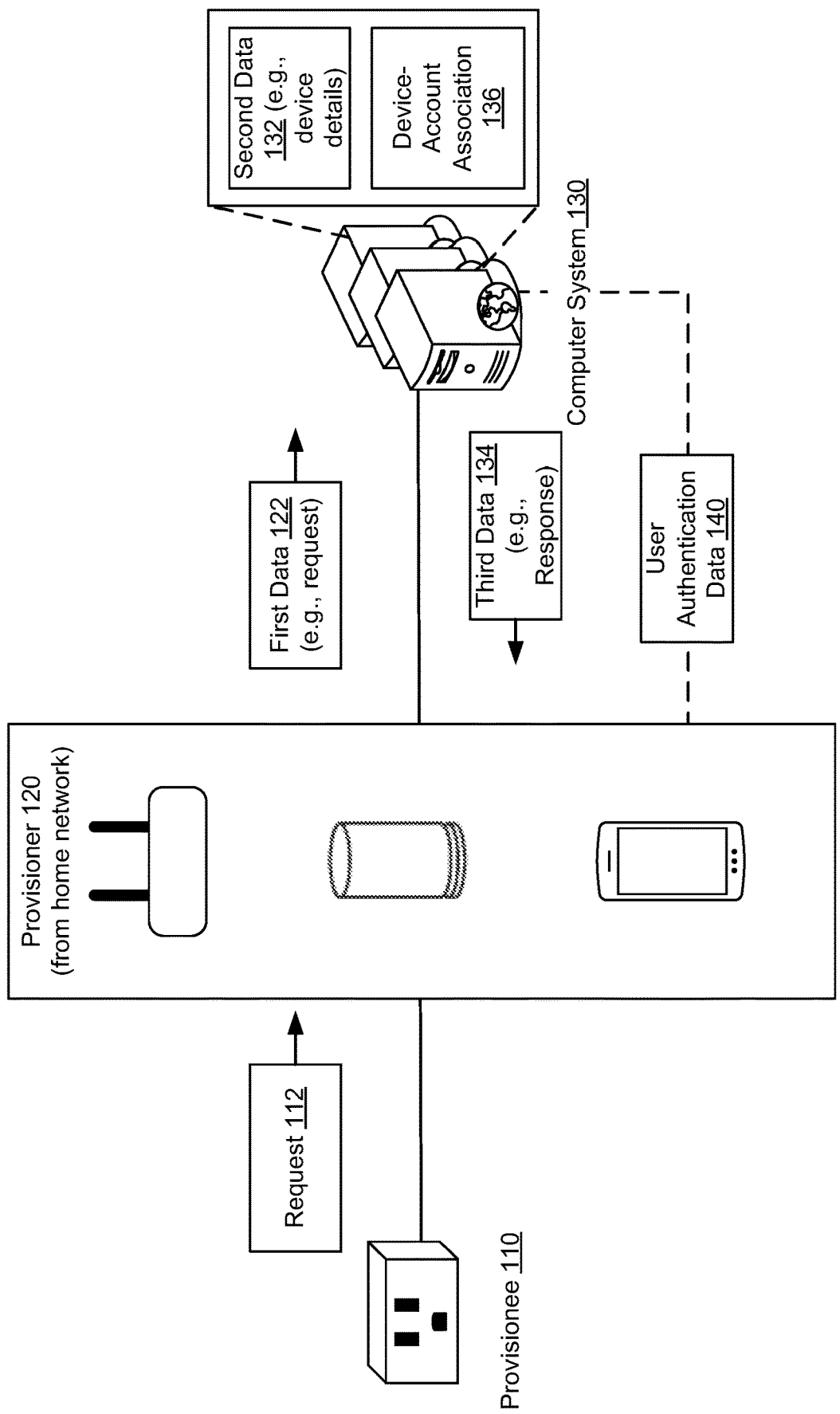
FIG. 1 illustrates an example of a computing environment for associating a device with a user account, according to an embodiment of the present disclosure.

FIG. 1 illustrates an example of a computing environment for associating a device with a user account, according to an embodiment of the present disclosure. As illustrated in FIG. 1, a provisionee 110, which is an example of a first device, requests registration such that the control over the provisionee 110 can be effectuated remotely from one or more other devices. In FIG. 1, the provisionee 110 is illustrated as a smart plug. Of course, the embodiments of the present disclosure similarly apply to any other type of user devices including internet of things (IoT) devices, such as a smart speaker, a smart appliance, a smart control system (e.g., a thermostat), a smart set top box, a smart television, a smart sensor, and the like. Upon a registration trigger event (e.g., the first time the provisionee 110 is powered on or connected to a home network, or upon a local determination that no registration has been performed yet, or some other event), the provisionee 110, among other things, sends a request 112 to a second device, illustrated in FIG. 1 as a provisioner 120. The request 112 includes information about the provisionee 110, such as the type of the provisionee 110 and/or an identifier of the provisionee 110 (e.g., a product identifier such as its stock keeping unit (SKU) or a serial number). The request 112 can be a beacon sent over an established data connection with the provisioner 120 (or a beacon of a different type. For example, the beacon can be a Wi-Fi beacon if the data connection is an established Wi-Fi connection or it may be a Bluetooth, Zigbee, or audio beacon as appropriate for the type of data connection.

The provisioner 120 can be any type of a device that is on a home network and that has a data connection to a computer system 130. For instance, the provisioner 120 can be an access point, a smart speaker, a mobile phone, a personal computer, or any other user device. The provisioner 120 sends first data 122 that includes a to the computer system 130. The request sent in the first data 122 can correspond to the request 112 (e.g., includes the same information). Sending the first data 122 can include forwarding the beacon, or as applicable, repackaging the information in the beacon into another format suitable for the data connection between the provisioner 120 and the computer system 130.

In response, the computer system 130 validates the beacon by determining, for instance, that the information in the beacon is proper based on second data 132 about the provisionee 110. The second data 132 can include information about device types available from a manufacturer, correct device identifiers of the manufacturer, and the like. The validation can be based on a determination that the device type of the provisionee 110 corresponds to one of the device types and the device identifier of the provisionee 110 is a correct device identifier. Once validated, the computer system 130 sends third data 134 that includes a response with instructions to the provisioner for a user authentication.

Different techniques are available to perform the user authentication. Any of such techniques can be performed following the validation of the beacon. In one example technique, the user is already authenticated on the provisioner 120. In this example the provisioner 120 can send an identifier of the user to the computer system 130. The identifier represents user authentication data 140 (the transmission of the user authentication data 140 is shown in FIG. 1 with a dashed line to indicate that the illustrative user authentication technique is one example of other available techniques). In response, the computer system 130 determines a user account corresponding to the identifier of the user and creates an association 136 between the identifier of the provisionee 110 and the user account. In another example, the user is not already authenticated on the provisioner 120. In this example, a user authentication is performed by presenting a user interface at the provisioner 120 for the user to enter credentials (e.g., username and password) and the provisioner 120 can send the received user input as the authentication data 140 to the computer system 130 or to a second system for authentication. If sent to the computer system 130, the computer system 130 authenticates the user based on the user input to then determine the user account and associate the identifier of the provisionee 110 and the user account. If sent to the second system, the second system can send an indication of the user authentication to the computer system 130 or to the provisioner 120 that sends this indication to the computer system 130. In both cases, the computer system 130 receives the indication and completes the association 136 of the identifier of the provisionee 110 and the user account.

Once the association 136 is generated, control of the provisionee 110 become available through the home data network. For instance, the user can turn on or off the provisionee 110 through user input at a user interface presented by the provisioner 120 (or any of the user devices on the home data network whether, for instance, the access point, the smart speaker, or the mobile phone). The provisioner 120 can generate the applicable command in response to the user input and send the command to the provisionee 110.

Figure 2:
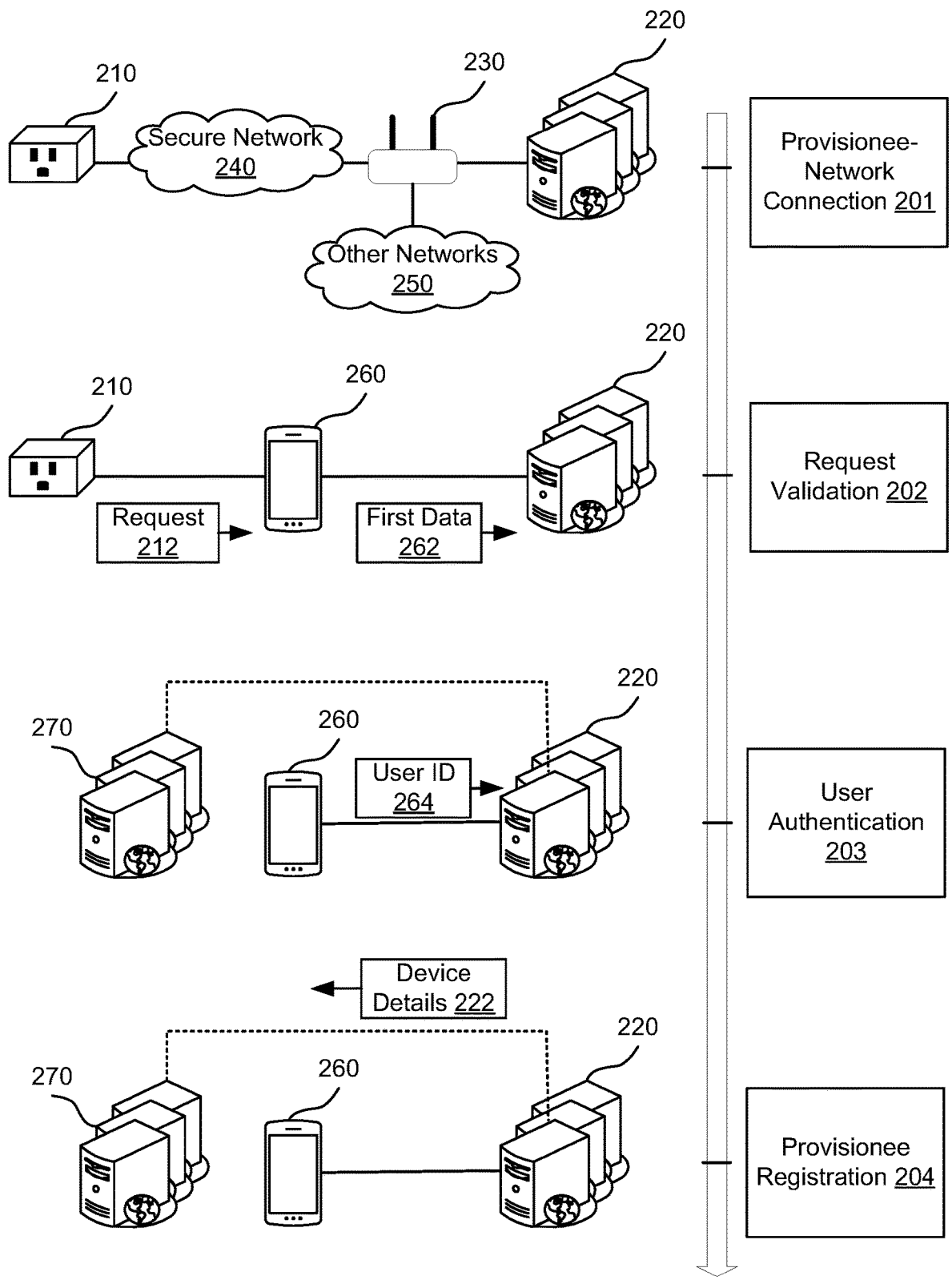
FIG. 2 illustrates an example of stages for associating a device with a user account, according to an embodiment of the present disclosure.

FIG. 2 illustrates an example of stages for associating a device with a user account, according to an embodiment of the present disclosure. As illustrated, the stages include a provisionee-network connection stage 201, a request validation stage 202, a user authentication stage 203, and a provisionee registration stage 204.

In an example, during the provisionee-network connection stage 201, a provisionee 210 joins a secure network 240 (e.g., a home network such as a secure local area network (LAN) protected with an access credential) by establishing a data connection to the secure network (e.g., with a device 230, such as an access point, that belongs to the secure network 240). The data connection can be established according to instructions of a computer system 220. The provisionee 210, the computer system 220, and the device 230 are examples of the provisionee 110, the computer system 130, and the provisioner 120, respectively, of FIG. 1.

In particular, the provisionee is associated with an entity, such as a manufacturer, a seller, or any other entity that provides the provisionee 210. In comparison, the computer system 220 is associated with a service provider other than the entity. Thus, the entity may be referred to herein as a third party (3P) for distinction from the service provider. The computer system 220 is configured to facilitate the automatic addition of the provisionee 210 to the secure network 240 upon a trigger event (e.g., the first time the provisionee 210 is powered on). Automatic refers to a process where user input at the provisionee 210 after the trigger event is not needed to complete the process of the provisionee 210 joining the secure network 240.

The automatic addition process can involve the computer system 220 receiving credentials of the provisionee 210 and sending credentials of the secure network 240 via the device 230. The received credentials include, for instance, a digital certificate of the provisionee and the sent credentials include, for instance, a service set identifier (SSID) and a passphrase to join the secure network 240. The computer system 220 can send the credentials based on verification of a user account, where this user account is managed by the computer system and includes one or more user identifiers. Example techniques for the automatic addition process are further described in U.S. application Ser. No. 16/285,934, filed Feb. 26, 2019, the contents of which are hereby incorporated by reference in its entirety for all purposes.

Once on the secure network 240, the provisionee 210 can have access to other networks 250 through, for instance, the device 230. The other networks 250 can include different types of data networks, such as a public network (e.g., the Internet).

In an example, during the request validation stage 202, the provisionee 210 sends a request 212 for registering the provisionee 210 with the user account (e.g., a data indicating a request to associate the provisionee 210 with the user account). The request 212 can be sent to a provisioner 260 and the provisioner 260 can send first data 262 (e.g., the content of the request 112) to the computer system 220. The provisioner 260 is an example of the provisioner 120 of FIG. 1.

Although FIG. 2 illustrates the provisioner 260 as being different from the device 230, the two devices can be the same device. In another illustration, the device 230 is the provisioner and a user interface to an application of the provisioner can be presented on a second device (e.g., element 260 in FIG. 2, where for instance, the device 230 is an access point and is acting as the provisioner and the second device is a smartphone providing the user interface to the access point's application. In another illustrate, another device of the secure network and in communication with the access point, such as a smart speaker or another IoT device, can be the provisioner while the second device is the smartphone).

Generally, the provisioner 260 is also on the secure network 240. The request 212 can be sent over a data link of a same type as the data connection between the provisionee 210 and the secure network 240. For instance, if a Wi-Fi data connection is established, a Wi-Fi data link can be used to send the request 212 and this request can be a Wi-Fi beacon request or Wi-Fi beacon response. In this case, the provisioner 260 may merely forward the request 212 to the computer system 220 (e.g., the request 262 is the same as the request 212, except with header information updated as needed). Alternatively or additionally, the request 212 can be sent over a data link of a different type than the data connection. For instance, the request 212 can be sent as a Bluetooth beacon probe or via any other data link (e.g., over a Zigbee link or as an audio signal). In this case, the provisioner 260 can repackage content of the request 212 to generate and send the first data 262 to the computer system 220.

Different types of content of the request 212 are possible. In one example, the content (e.g., payload) includes unique device data that uniquely identifies the provisionee 260. For instance, the unique device data can be a device serial number and a device type. Such content can be encrypted with a key associated with the computer system 220. In this case, during the provisionee registration stage 204, the content is decrypted by the computer system 220 to complete the registration. The key can be a shared key generated in the provisionee-network connection stage 201, or a public key of the computer system 220 pre-stored on the provisionee 210 (e.g., stored thereon during manufacturing) based on an identifier of the entity and the family of device type to which the provisionee 210 belongs. In another example, the content includes a hash that was generated by the computer system during the provisionee-network connection stage 201. In an example, the provisionee 210 provides the unique device data and the computer system 220 generates the hash therefrom during the provisionee-network connection stage 201. In this case also, during the provisionee registration stage 204, the computer system 220 uses the hash to retrieve the unique device data and complete the registration.

During the request validation stage 202, the computer system 220 determines whether the request 212 (or the first data 262) is valid by determining whether the provisionee 210 is associated with the entity. For instance, the computer system 220 determines second data from the provisionee's 210 digital certificate, such as the identifier of the entity and the device type. If the content of the request 262 or if the request 212 is received from a device that has matches with the entity's identifier and device type, the request 212 (or the first data 262) is determined to be valid.

In an example, during the user authentication stage 203, the computer system 220 determines whether the user attempting to register the provisionee 210 is a valid user. To do so, the computer system 220 instructs the provisioner 260 to initiate a user authentication. The instructions can be sent as third data. The user authentication includes multiple phases. In a first phase, the computer system 220 determines a user identifier 264 associated with the user. In a second phase, the computer system 220 determines whether the user identifier 264 is associated with the user account that was used in the provisionee-network connection stage 201 to add the provisionee 210 to the secure network 240. If the user identifier 264 is associated with that user account (e.g., the user account includes one or more user identifiers and the user identifier 264 matches one of such identifiers), the user is authenticated and the provisionee registration stage 204 can be initiated.

Different techniques for determining the user identifier 264 are possible. In one example, the provisioner 260 executes a first application associated with the service provider. The first application presents login fields for entering login data, such as a field for entering the user identifier 264 and another field for entering a passphrase associated with a user account with the service provider (e.g., the same user account that was used in the provisionee-network connection stage 201). The computer system 220 receives the login data, including the user identifier 264, and authenticates the user accordingly. In another example, the user may have been previously (e.g., before the user authentication stage 203) authenticated. In this example, the first application may merely send the user identifier 264 to the computer system 220.

In yet another example of user authentications, the provisioner 260 executes a second application associated with the entity rather than the service provider (e.g., a different user account than the one that was used in the provisionee-network connection stage 201). The second application presents login fields for entering the login data to the user account with the service provider or to a user account with the entity. In the former case, the computer system 220 receives login data from the provisioner 260 and completes the authentication as explained in the previous two examples. In the latter case, a computer system 270 associated with the entity authenticates the user based on the login data and sends data about the user authentication (e.g., sends the user identifier 264) to the computer system 220.

In an example, during the provisionee registration stage 204, the computer system 220 causes a registration of the provisionee with one or more user accounts to be generated. Such user accounts can include the same user account that was used in the provisionee-network connection stage 201 and/or the user account associated with the entity. For instance, the computer system 220 adds the unique device data to the user account associated with the service provider and/or sends the unique device data to the provisioner 260 and/or the computer system 270. The provisioner 260 and/or the computer system 270 receives the unique device data and stores such data under the user account associated with the entity. Upon completion of the registration, control over the provisionee 210 can be effectuated through the secure network 240. For instance, the first application and/or the second application present a user interface. User input at the user interface can be sent as control commands to the provisionee 210.

To illustrate the use of the four stages 201-204, consider the example of a smart plug as the provisionee 210 and a smartphone as the provisioner 260. In the provisionee-network connection stage 201, the smart plug is added to a secure home Wi-Fi network. In the request validation stage 202, the user operates the smartphone and launches an application that can be either the first application or the second application. The application sends a Wi-Fi beacon probe request using a user datagram protocol (UDP) to query about added devices but not yet registered. The smart plug responds with a Wi-Fi beacon probe response including its device serial number and device type. The smartphone forwards the beacon probe response to the computer system 220 that then validates this response. In turn, the computer system 220 instructs the application to present the login fields. The application presents a login page explaining that a smart plug was detected and requesting the login data. The relevant user input is received at the smartphone and the user identifier 264 is sent to the computer system 220. Upon authenticating the user, the computer system 220 adds the device serial number and the device type to the user account associated with the service provider and sends such data to the computer system 270 for addition to the user account associated with the entity. In this way, the user can operate the application to turn on and off and perform other controls on the smart plug.

As described herein, the registration process can utilize a server-based association of the identifier of the provisionee and a user account. This process is referred to herein as a server-based association process (SBAP). The server here is an example of the computer system 130 and the computer system 220 of FIGS. 1 and 2.

In addition to implementing an SBAP, the computer system implements functionalities related to a device setup service (DSS) by which the computer system facilitates the establishing of the data connection between the provisionee and the provisioner such that the provisionee device can join the home data network (e.g., the automatic addition process as described in connection with FIG. 2). As such, DSS refers herein to a server-based setup for establishing the data connection and joining a home data network.

In various embodiments, a computer system implementing DSS and SBAP can be associated with a service provider. The provisionee can be a third party (3P) device available (e.g., designed by, manufactured by, offered by, and/or delivered from a third party other than the service provider).

For a 3P device as a provisionee, there are cases where the 3P device connects to a user's home data network (e.g., a home Wi-Fi network) through DSS, but is not associated with a 3P account. DSS (e.g., the service provider's computer system implementing DSS) is aware of the 3P device, but cannot link the 3P device to the 3P account (or to a user account with the service provider) until the user provides an account link. The provisionee, in this case, would be orphaned—connecting to DSS but not a service of the third party. For the 3P system to detect an orphaned device, a 3P application on, for instance, the user's mobile phone uses local discovery over a network (such as Wi-Fi) to detect the provisionee. The provisionee responds with a user datagram protocol (UDP) message, including its serial number. The 3P system then looks up the serial to see if the provisionee is associated with a 3P users account. If not, the 3P application shows a screen to the user to associate the provisionee with their 3P account. The user then signs into their user account with the service provider (using a user login) and links their 3P account to their user account with the service provider. The service provider's computer system can then confirm and alert the 3P system of the device information to associate the information about the provisionee with the user's 3P account.

Figure 3:
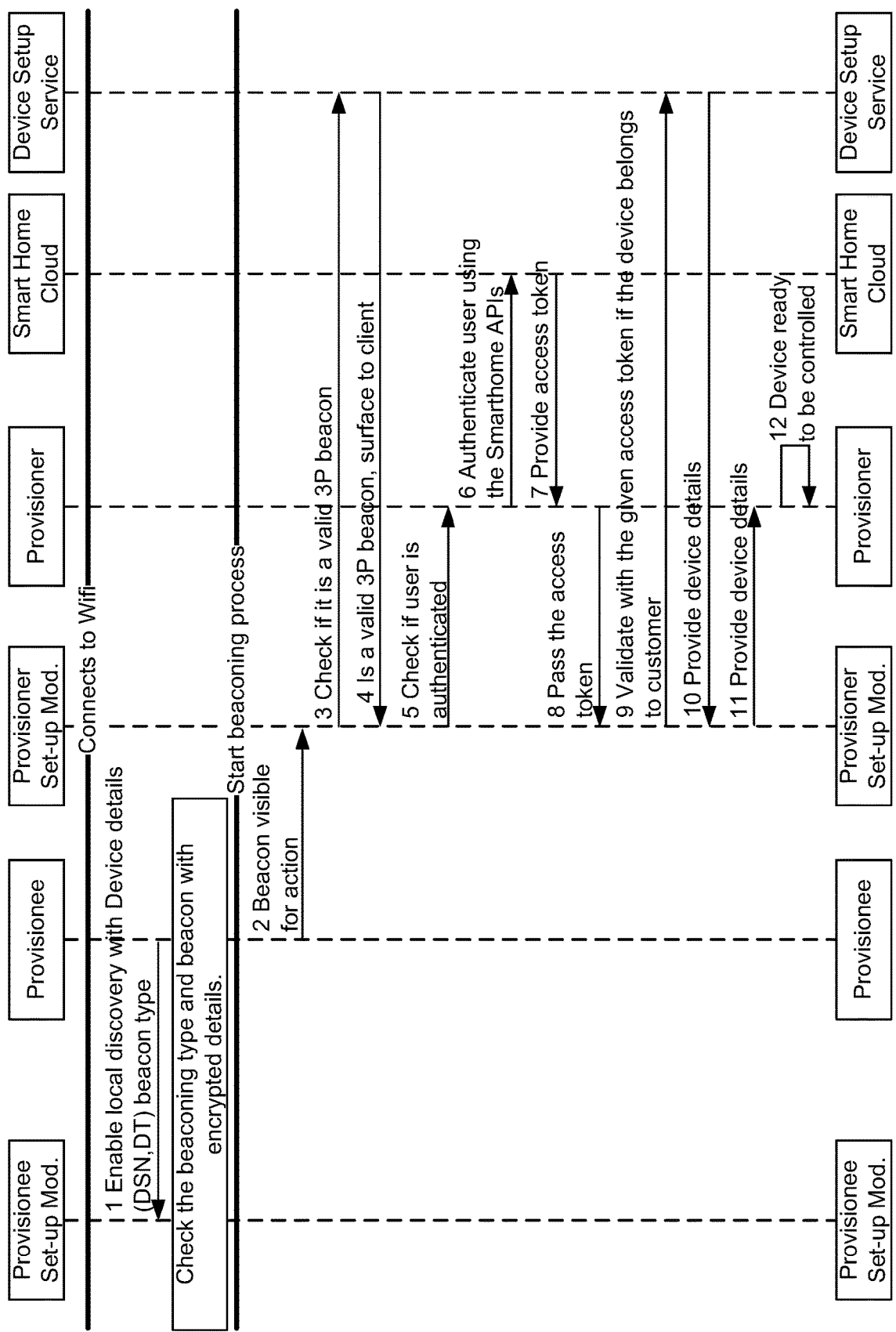
FIG. 3 illustrates an example of a diagram for associating a device with a user account, according to an embodiment of the present disclosure.

FIG. 3 illustrates an example of a diagram for associating a device with a user account, according to an embodiment of the present disclosure. Here, the device is a provisionee. The computer system includes smart home cloud and a DSS (e.g., a first computing service for managing home applications where the first computer service is hosted on a cloud system, and a second computing service for establishing the data connection and joining a home data network where the second computing service is hosted on another set of computing resources). As illustrated in FIG. 3, the current state of the provisionee is that the provisionee is on Wi-Fi. The provisionee is not registered to 3P yet. When a user launches an application of the provisioner (which can also be a 3P device), devices that were set up via DSS should be made visible locally. The provisionee sends a beacon and provides information that the provisionee is available for registration. The application detects this beacon and provides information to the user. The user is presented an authentication (e.g., a user login to a user account with the service provider) screen. Once authenticated, and if the provisionee's setup user identifier matches the user identifier with the service provider, the device details are decrypted and provided back to the provisioner.

As used herein, 3P provisioner (provisioner) refers to device that has the user authenticated with a 3P authorization protocol (e.g., OAuth 2.0). 3P provisionee (provisionee) refers to a provisionee that is connected to the Internet and was set up using DSS and has a session token that uniquely identifies the device user relationship. A set-up module for the provisionee (shown in the figures as "provisionee set-up module") refers to a software module developed according to a software development kit (SDK) provided by the service provider and is running inside the 3P provisionee. A set-up module for provisioner (shown in the figures as "provisioner set-up module") refers to a software module provided by the service provider and is running in the 3P provisioner. Additionally or alternatively, each of the provisionee set-up module and the provisioner set-up module may be specialized hardware developed according to specifications defined by the service provider. DSS refers to the service provider's device provisioning service which is used during setup of the provisionee.

When the provisionee comes online, it currently provides the session token to the 3P cloud (e.g., the 3P system providing a registration process and/or control functionalities over the provisionee). The 3P cloud now tries account linking to determine if there is any 3P account that is linked for the user identifier. If the 3P account comes back as not linked, then the provisionee can enable a local discovery while it waits for account linking to proceed in parallel.

The provisionee enables local discovery with device details (an example could be device serial number (DSN), device type (DT)) beacon type. As part of local discovery, the provisionee informs the set-up module on provisionee to start beaconing with a unique information (could be DSN and DT) as illustrated with a first step and the provisionee passes the beacon as illustrated with a second step. The service provider's computer system does not need this information and, thus, this information can be something that is completely encrypted and can only be decoded by the 3P system.

The encrypted 3P data is passed back only after successfully validating that it is the same user account with the service provider (or an account from the same family of user accounts) as illustrated with a third step. The encrypted information can only be decoded by DSS as the data is saved in DSS using a mutual TLS call after setup using the same encryption channels used during setup.

Beaconing is started by the provisionee and different types of beaconing are supported (Bluetooth and Wi-Fi are some beaconing types listed below, but the present disclosure is not limited to these modes). The set-up module on the provisionee starts beaconing the device as illustrated with the first step. The provisioner identifies (details on identification below) these as beacons and provides, as illustrated with the second step, the beacon details to the service provider's computer system to validate as a 3P beacon (e.g., the validation can be performed by the DSS). This validation involves ensuring the beacon is a valid DSS beacon, a valid 3P device beacon, and/or beaconing with local discovery mode as illustrated with the third step.

If the beacon is found to be a valid 3P device beacon (process identifier (PID) based on the vendor's namespace), DSS responds to the provisioner as valid beacon please authenticate using an authentication mechanism for the user to retrieve the 3P provisionee details as illustrated with a fourth step.

The 3P provisioner checks if the user is authenticated, and if already not authenticated, then authenticates the user using its authentication framework (e.g., a user login to a user account with the service provider) as illustrated with a fifth step. As part of the authentication illustrated in a sixth step, the 3P system arrives at an access token that can be used to identify the user in the service provider's system which is then passed to the set-up module on the provisioner as illustrated with a seventh step and an eight step. This access token is used by DSS to validate and identify the user as illustrated with a ninth step. On a successful validation of the user, the encrypted information is provided back to the set-up module on the provisioner as illustrated with a tenth step. This encrypted information then can be propagated back to the user as illustrated with an eleventh step. The device is ready to be controlled now as illustrated with a twelfth step.

Once the device is setup (e.g., the Wi-Fi connection is established based on DSS), multiple techniques are possible to initiate the registration illustrated with the first step. These techniques include, for instance, reactive probe requests by the provisionee, proactive probe requests by the provisionee on network connectivity, and proactive Bluetooth beaconing by the provisionee on network connectivity.

The technique for reactive probe requests by the provisionee is expected to work for applications and devices that search for a device recently setup by DSS. A Wi-Fi network probe request is sent via the provisioner over UDP and contains a received signal strength indicator (RSSI), an encoded service set identifier (SSID), and a media access control (MAC) address of the provisioner that is trying to connect. The provisionee responds to these beacons only if it is not registered in the 3P system (handled by 3P). This involves decrypting the encoded SSID and ensuring that the device belongs to the same vendor by verifying with DSS. It also provides a unique way to identify the 3P device. If the provisionee can validate the provisioner and its authentication, then the provisionee hosts a Wi-Fi access point. This also means that the probe request is responded to with a success message for allowing a connection. The password of this particular network is calculated by the provisionee from the decoded SSID plus the provisionee's private key and a predetermined public key that was stored on the device by the manufacturer. Once the probe request is responded to, the provisioner can connect to this device using its password. This can be used to surface a message on the provisioner to ask the user for permission to connect to the new device and, thus, helping create an association in the 3P system.

The technique for proactive probe requests by the provisionee is expected to work for devices that are static and can respond to requests for probes like hub supported devices. The provisionee starts sending probe requests periodically. The probe request is formed in the same way as explained above for the reactive probe requests. The provisioner decodes this request and responds by providing an access point that can be connected to. This allows the provisionee to be connected to the provisioner and provide further information to the user which can be used to setup the device.

In the technique for proactive Bluetooth beaconing by the provisionee, after completing the network connection, the provisionee starts a Bluetooth beacon (augmented beaconing). The augmented beacon can be used for multiple operations including over the air (OTA) updates, Registration and Passwords syncs. The provisioner relies on the registration augmented beacon to inform the 3P system about a device that is eligible for registration in the 3P system. The Bluetooth beacon includes the PID and 3P specific hashed information instead of the authentication material index. The device capability advertised in the Bluetooth beacon ensures that it provides the data that is needed for an augmented beacon. The provisioner contains a thin layer which takes the Bluetooth advertisements and processes them. The thin layer, in turn, propagates the PIDs and device details back to the provisioner. The device details have a hashed value which is formed by encoding the device specific information (DSN, DT) and can only be decrypted using the private key of the manufacturer. Once the beacon is found to be relevant, this information can be parsed and used to identify the device and present this to the user. To get the list of PIDs supported, the provisioner would need to make a call to a service of the service provider on launch.

Figure 4:
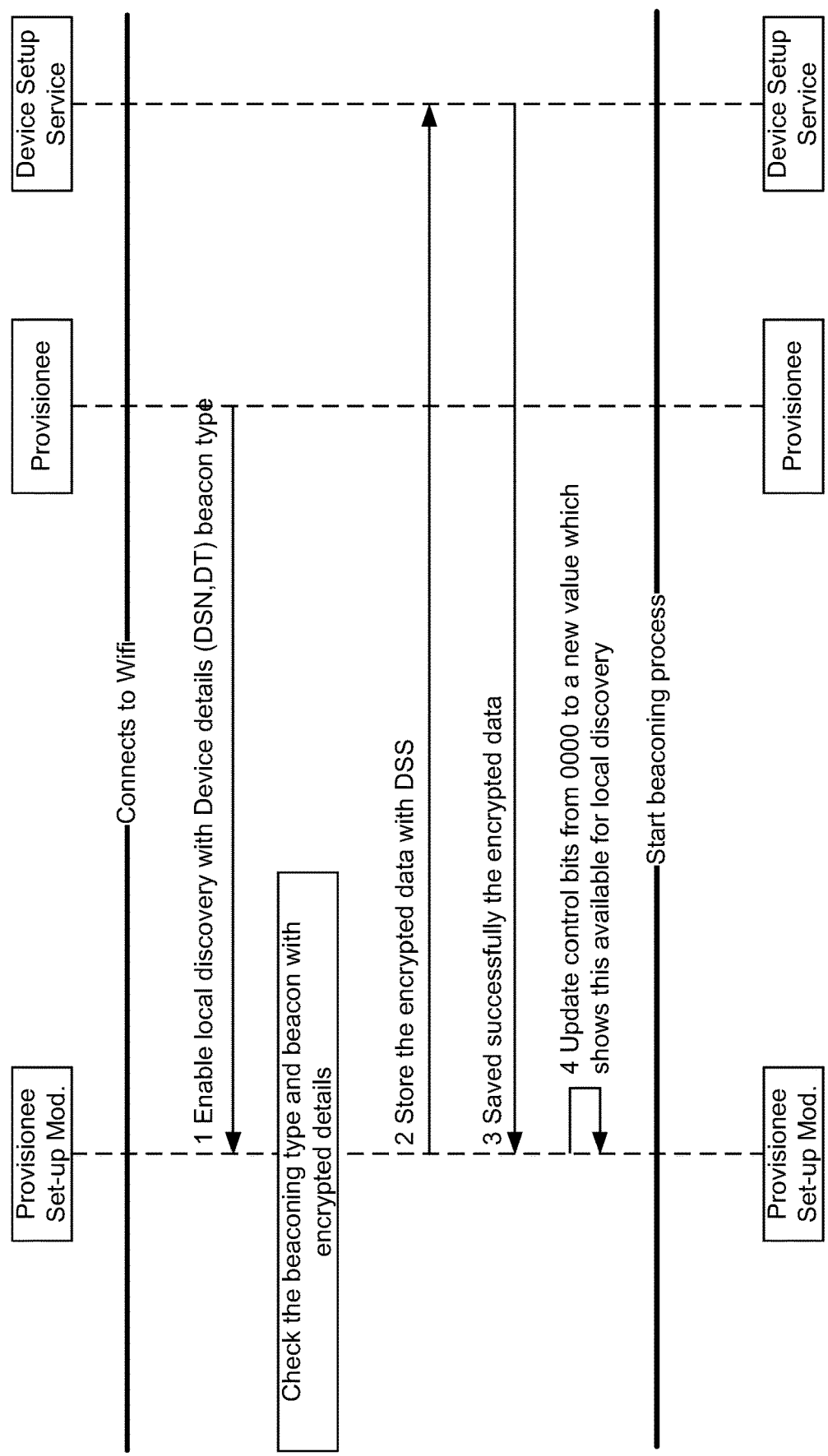
FIG. 4 illustrates an example of a diagram for sending a request associated with registering a device with a user account, according to an embodiment of the present disclosure.
Figure 5:
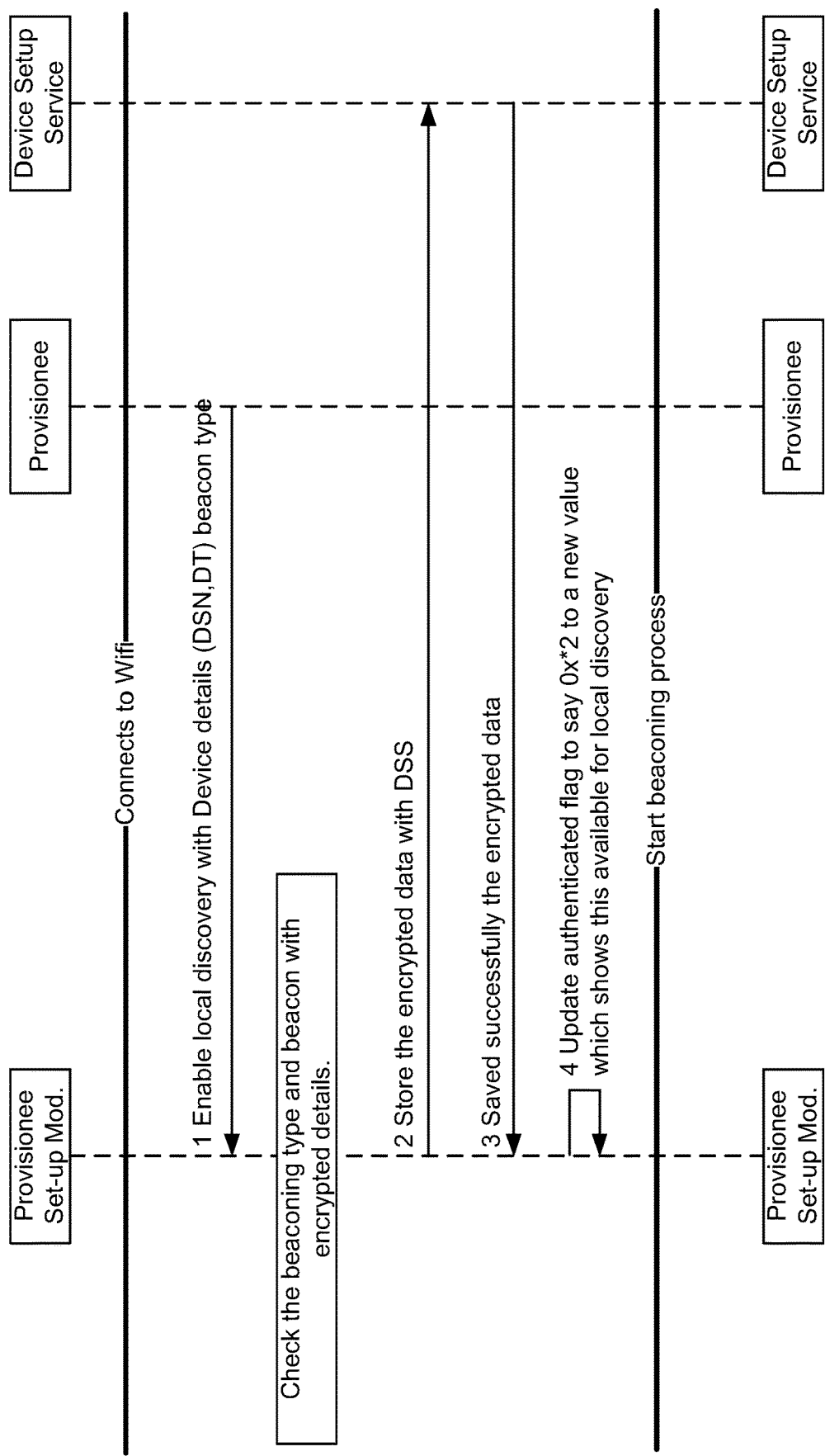
FIG. 5 illustrates another example of a diagram for sending a request associated with registering a device with a user account, according to an embodiment of the present disclosure.

Beaconing the device in different modes is possible as illustrated in FIGS. 4-5. In particular, there are multiple options that can be used for the beaconing. Some of them use Wi-Fi Probe requests, Bluetooth beacons, Zigbee or even a 900 MHz network join request command.

FIG. 4 illustrates an example of a diagram for sending a request associated with registering a device with a user account, according to an embodiment of the present disclosure. Here, the request is a Wi-Fi beacon. With a local discovery approach over Wi-Fi, an approach includes letting the 3P provisionee control when to start beaconing and the information that is needed as illustrated with a first step. The set-up module on the provisionee then saves this information in the cloud (e.g., on the service provider's computer system) as illustrated with a second step and a third step. This helps tie this information to the respective provisionee. Using the updated binary data (control flags are used an example here) on the probe requests, the beacon is sent for discovery as illustrated with a fourth step.

FIG. 5 illustrates another example of a diagram for sending a request associated with registering a device with a user account, according to an embodiment of the present disclosure. Here, the request is a Bluetooth beacon. Bluetooth devices which have been setup can use a similar approach as that of FIG. 4 (with the first three steps), where the device beacons are using the Bluetooth advertisement data. DSS can identify the device from the request of the provisionee. An approach here is to update the provisioning mode flags as illustrated with a fourth step. From these changes in the advertisement data, the set-up module on the provisionee can identify it as a local discovery beacon and present this to the 3P provisioner for further processing.

Figure 6:
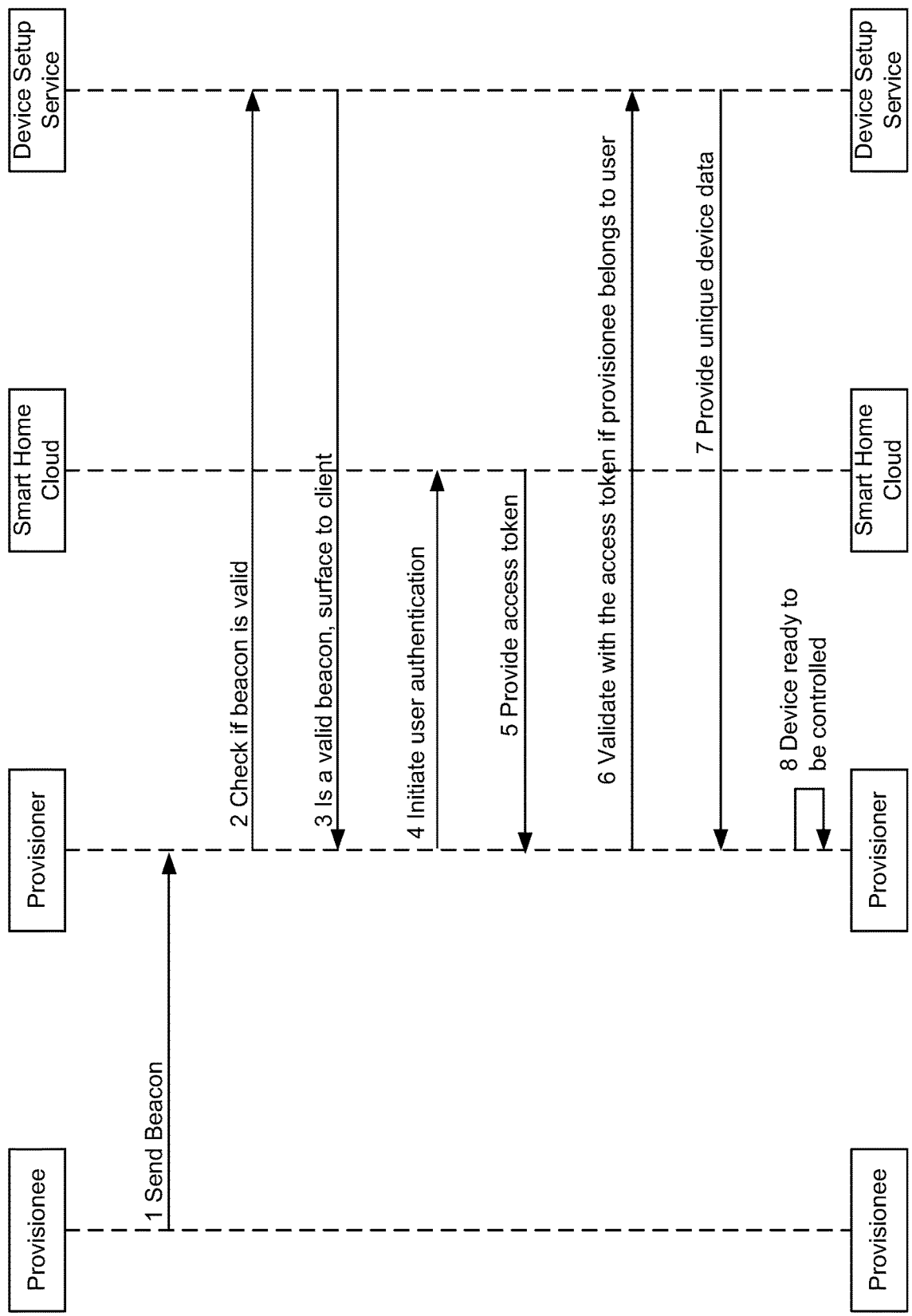
FIG. 6 illustrates another example of a diagram for associating a device with a user account, according to an embodiment of the present disclosure.

FIG. 6 illustrates another example of a diagram for associating a device with a user account, according to an embodiment of the present disclosure. As illustrated a computer system of a service provider (illustrated as including a smart home cloud and a DSS) registers a provisionee associated with an entity (e.g., a 3P device) through a provisioner. Unlike the diagram of FIG. 3, no set-up modules may be needed. Instead, functionalities related to the beaconing, beacon validation, user authentication, and/or device registration can be embedded in operating systems and/or native applications of the provisionee and/or provisioner. Like the diagram of FIG. 3, a data connection (e.g., a Wi-Fi connection) exists between the provisionee and the provisioner. This data connection is established according to instructions of the computer system (e.g., through DSS), where the instructions are based on a user account with the service provider (referred to herein as a service provider user account).

In a first step, the provisionee sends a beacon to the provisioner. The beacon includes unique device details. The beacon can be sent as a Wi-Fi beacon probe request, Wi-Fi beacon probe response, a Bluetooth augmented beacon, or any other type of request that can include the unique device data (e.g., an audio signal that encodes such data).

In a second step, the provisioner sends the beacon to the computer system. In particular, the provisioner repackages the beacon as needed (e.g., from a Bluetooth augmented beacon into an internet protocol (IP) packet) and sends it to DSS.

In a third step, the computer system determines whether the beacon is valid. For instance, DSS determines whether the beacon corresponds to a device available from the entity. If so, DSS sends a response back to the provisioner with instructions to present data about the provisionee (e.g., the device type) and initiate a user authentication.

In a fourth step, the provisioner initiates the user authentication. For instance, an application executing on the provisioner presents a login page or determines that a user is already logged in. A user identifier from the login data is sent to the computer system, such as to the smart home cloud.

In a fifth step, the computer system provides an access token to the provisioner. For instance, the Smart Home Cloud generates the access token. In one example, the access token includes the user identifier and/or other data about the user. In another example, the access token includes random data and/or a hash associated with the user identifier. In yet another example, the data in the access token may not relate to or be associated with the user data. Instead, the access token can include data derived from the initial data connection set-up, where the data is associated with the user account. For instance, the access token can be a session token associated with the data connection set-up between provisionee and the provisioner given the user account.

In a sixth step, the provisioner and the computer system complete the user authentication by validating that the user is properly associated with the provisionee. In particular, the provisioner sends the access token to the DSS. In an example, the DSS determines the user identifier and looks up the service provider user account. If the service provider user account includes the user identifier, the user authentication is successful. In another example, the access token is a session token. In this example, the computer system determines that the session token is associated with the user account to complete the user authentication.

In a seventh step, upon a successful user authentication, the computer system provides the unique device data to the provisioner. In particular, the DSS sends such data to the provisioner. If encrypted with a key associated with the computer system, the DSS decrypts the unique device data prior to sending it to the provisioner.

In an eight step, registration of the device is complete and the device can be controlled. Various registrations are possible. In one example, the DSS stores the unique device data in association with the service provider user account, thereby registering the provisionee with the service provider. In another example, the provisioner stores the unique device data in association with a user account with the entity (referred to herein as an entity user account), thereby registering the provisionee with the entity.

Figure 7:
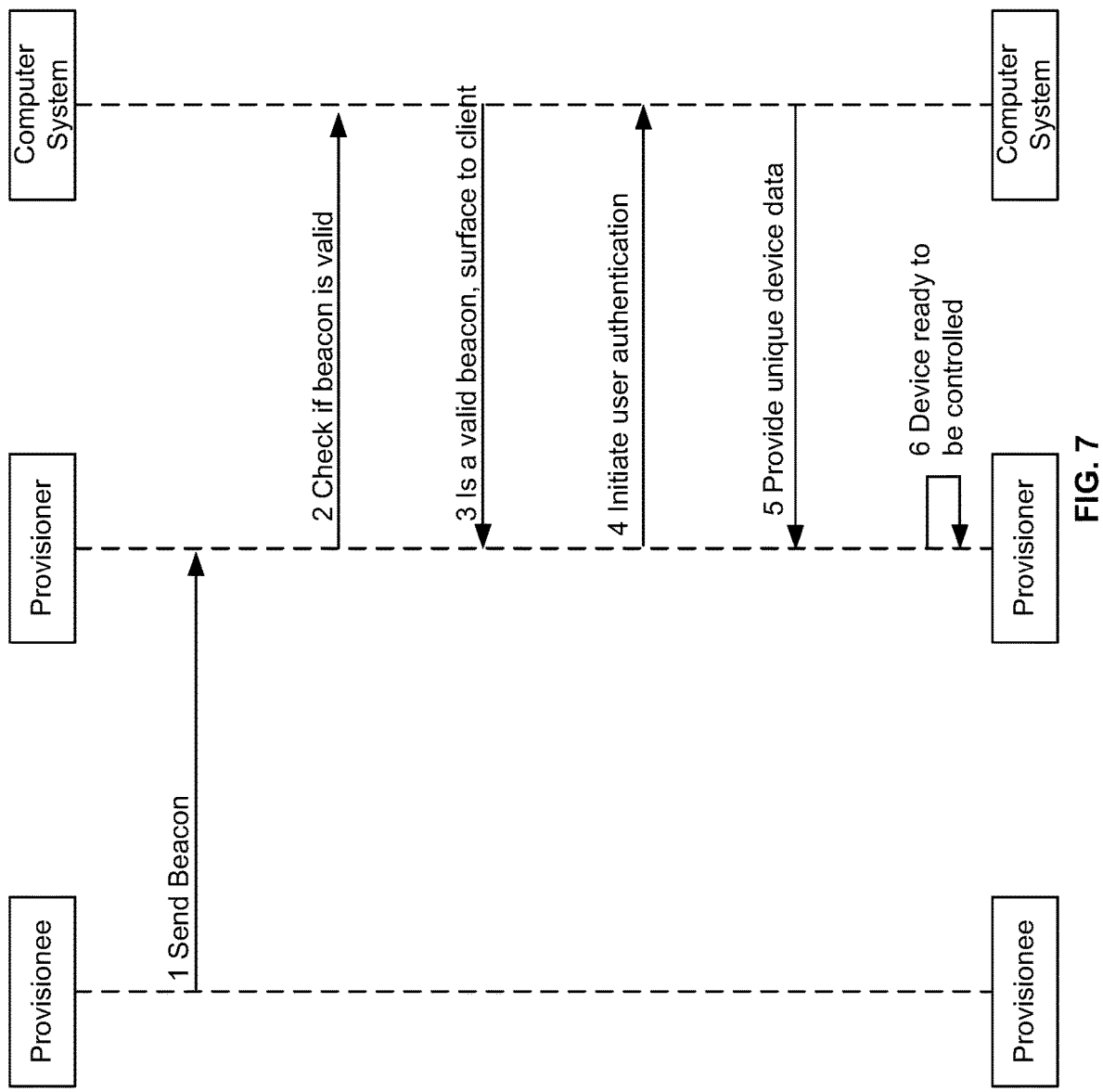
FIG. 7 illustrates yet another example of a diagram for associating a device with a user account, according to an embodiment of the present disclosure.

FIG. 7 illustrates yet another example of a diagram for associating a device with a user account, according to an embodiment of the present disclosure. As illustrated a computer system of a service provider registers a provisionee associated with an entity through a provisioner. Like the diagram of FIG. 6, a data connection (e.g., a Wi-Fi connection) exists between the provisionee and the provisioner. This data connection is established according to instructions of the computer system, where the instructions are based on a service provider user account. Unlike the diagram of FIG. 6, the functionalities of the Smart Home Cloud and DSS can be combined in a single computing service. Based on the combined functionalities, an access token need not be used and the user authentication can be simplified. Accordingly, steps not relating to the user authentication are similar to corresponding steps in FIG. 6. Similarities are not repeated herein in the interest of brevity.

In a first step, the provisionee sends a beacon to the provisioner to check its validity. In a second step, the provisioner sends the beacon to the computer system. In a third step, the computer system determines whether the beacon is valid and, if so, sends a response back to the provisioner with instructions to present data about the provisionee (e.g., the device type) and initiate a user authentication.

In a fourth step, the provisioner and the computer system perform the user authentication. In particular, the provisioner sends the user identifier to the computer system and the computer system determines whether the service provider user account includes the user identifier. An access token need not be used for the user authentication.

In a fifth step, upon a successful user authentication, the computer system provides the unique device data to the provisioner. In a sixth step, registration of the device is complete and the device can be controlled.

Figure 8:
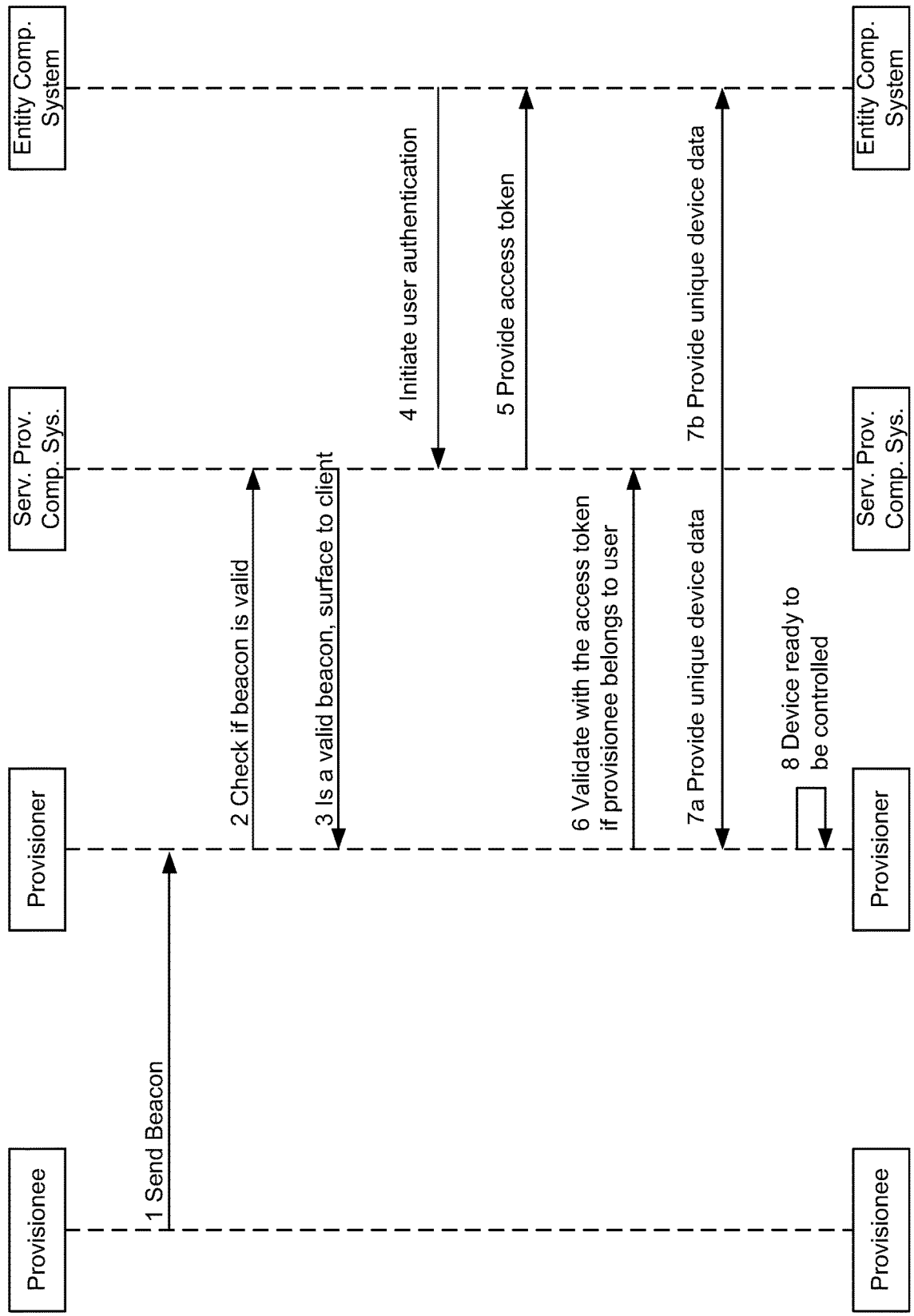
FIG. 8 illustrates a further example of a diagram for associating a device with a user account, according to an embodiment of the present disclosure.

FIG. 8 illustrates a further example of a diagram for associating a device with a user account, according to an embodiment of the present disclosure. As illustrated a computer system of a service provider (referred to herein as a service provider computer system) facilitates a registration of a provisionee associated with an entity through a provisioner. Like the diagram of FIG. 7, a data connection (e.g., a Wi-Fi connection) exists between the provisionee and the provisioner. This data connection is established according to instructions of the service provider computer system, where the instructions are based on a service provider user account. Unlike the diagram of FIG. 7, a computer system of the entity (referred to herein as an entity computer system) is involved in the user authentication. Steps not relating to the user authentication are similar to corresponding steps in FIG. 7. Similarities are not repeated herein in the interest of brevity.

In a first step, the provisionee sends a beacon to the provisioner to check its validity. In a second step, the provisioner sends the beacon to the service provider computer system. In a third step, the service provider computer system determines whether the beacon is valid and, if so, sends a response back to the provisioner with instructions to present data about the provisionee (e.g., the device type) and initiate a user authentication.

In a fourth step, the provisioner initiates a user authentication, where this user authentication involves, in part, the entity computer system. In particular, an application executing on the provisioner presents a login page, where the application is associated with the entity (e.g., previously downloaded to the provisioner from the entity computer system or another application system). Login data is received via the login page and a user identifier from the login data is sent to the entity computer system. In turn, the entity computer system performs a first user authentication using the login data (e.g., based on the user identifier and a credential such as a passphrase). If the first authentication is successful, the entity computer system sends the user identifier to the service provider computer system for a second user authentication involving a determination of whether the user is properly associated with the provisionee.

In a fifth step, the service provider computer system provides an access token to the entity computer system. The access token can be similar to the access token described in connection with FIG. 6. Although not illustrated in FIG. 7, the access token may be provided to the provisioner instead of the entity computer system, similarly to FIG. 6.

In a sixth step, the provisioner and the service provider computer system complete the second user authentication by validating that the user is properly associated with the provisionee. In particular, the provisioner receives the access token from the entity computer system and sends the received access token to the service provider computer system. In response, the service provider computer system uses the access token for the validation, as described herein above in connection with FIG. 6.

In a seventh step, upon a successful user authentication, the service provider computer system provides a registration of the device. For instance, the service provider computer system sends the unique device data to the provisioner in a first sub-step and/or to the entity computer system in a second sub-step. If encrypted with a key associated with the computer system, the unique device data is decrypted prior to being sent.

In an eight step, registration of the device is complete and the device can be controlled. Various registrations are possible. In one example, the service provider stores the unique device data in association with the service provider user account, thereby registering the provisionee with the service provider. In another example, the provisioner and/or the entity computer system store the unique device data in association with an entity user account), thereby registering the provisionee with the entity.

Although FIG. 8 illustrates that the entity computer system can be involved in steps related to user authentication and device registration, the embodiments of the present disclosure are not limited as such. In particular, some or all of the steps related to beacon validation can involve the entity computer system in addition to or alternative to the service provider computer system. In an illustration, the entity computer system sends input of the entity to the service provider computer system. The input can define various parameters for validating the beacon. The service provider computer system uses the parameters in its validation of the beacon. For instance, the input specifies that a particular type of the beacon and/or particular data in the beacon (e.g., a signature, or unique identifier of the provisionee, provisionee's device type, and/or the entity) are needed. In this case, upon receiving the beacon, the service provider computer system performs the beacon validation by determining whether the beacon is of the particular type and/or includes the particular data.

FIGS. 9-14 illustrate example flows for registering a to register a first device (e.g., a provisionee) available from an entity with a user account (e.g., a service provider user account or an entity user account) by using a service provider computer system and a second device on a secure network (e.g., a provisioner). Instructions for performing the operations and related sub-operations can be stored as computer-readable instructions on one or more non-transitory computer-readable media of the relevant computing component (e.g., the first device, the second device, the service provider computer system, or an entity computer system). As stored, the instructions represent programmable modules that include code or data executable by one or more processors of the relevant computing component. The execution of such instructions configures the relevant computing component to perform the specific operations shown in the corresponding figure and described herein. Each programmable module in combination with the respective processor(s) represents a means for performing a respective operation(s) or a respective sub-operation(s). While the operations and sub-operations are described in a particular order, it should be understood that no particular order is necessary and that one or more operations and/or sub-operations may be omitted, skipped, and/or reordered.

Figure 9:
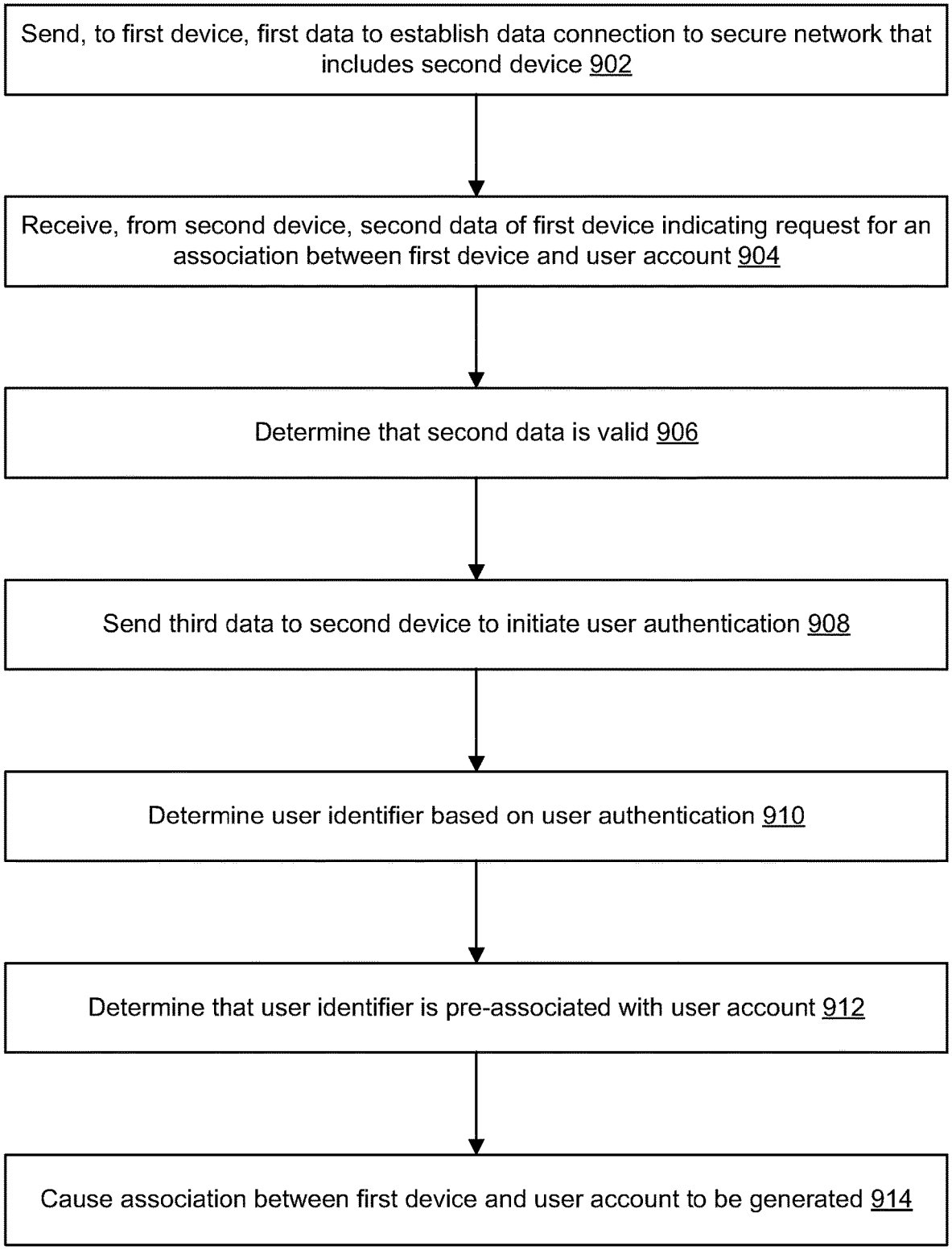
FIG. 9 illustrates an example of a flow for associating a device with a user account, according to an embodiment of the present disclosure.

FIG. 9 illustrates an example of a flow for associating the first device with the user account, according to an embodiment of the present disclosure. The flow may start at operation 902, where the service provider computer system sends, to the first device, first data to establish a data connection to the secure network that includes the second device. For instance, the first data includes credentials to join the secure network, such as an SSID and a passphrase for the data connection. As part of facilitating the establishing of the data connection, the service provider computer system receives a digital certificate of the first device and determines the service provider user account.

At operation 904, the service provider computer system receives, from the second device, second data of the first device. The second data indicates a request for an association between the first device and a user account. For instance, the second data is sent as a beacon over a Wi-Fi data link or a Bluetooth link between the first device and the second device. Other techniques are also available to send the second data, such as sending an audio signal that encodes the second data. The second data can include unique device data, such as a device serial number and a device type. Additionally or alternatively, the second data can include random data or a hash usable by the entity provider to determine the unique device data. The second data can also be encrypted with a key associated with the service provider computer system and/or a key associated with the entity computer system.

At operation 906, the service provider computer system determines that the second data is valid. In an example, the service provider computer system validates that the second data is sent from a device that is associated with the entity. For instance, the service provider computer system determines digital certificate data about the entity and the first device from the digital certificate and determines a match between the second data and the digital certificate data.

At operation 908, the service provider computer system sends third data to the second device to initiate a user authentication. In an example, the third data includes instruction for a user login on the second device. The user login can be via an application associated with the service provider (referred to herein as a service provider application) or an application associated with the entity (referred to herein as an entity application). If the user is not already logged in, the service provider application and/or the entity application presents a user interface for receiving login data that includes the user identifier.

At operation 910, the service provider computer system determines a user identifier based on the user authentication. In an example, the service provider computer system receives the user identifier and/or determines the user identifier from an access token, where the user identifier and/or access token can be received from the provisioner or the entity computer system depending on the underlying application.

At operation 912, the service provider computer system determines that the user identifier is pre-associated with the user account (e.g., an association between the user identifier and the user account already exists such as being generated and stored prior to the initiation of the user authentication or the establishing of the data connection to the secure network). In an example, the service provider computer system determines that the association between the user identifier and the service provider user account is already stored in a data store or that the service provider user account already lists the user identifier.

At operation 914, the service provider computer system causes the association between the first device and the user account to be established. In an example, the user account is the service provider user account. In this case, upon determining the association between the user identifier and the service provider user account, the service provider computer system determines the unique device data from the first data and adds to the data store an association between such data and the service provider user account or stores such data in the service provider user account. In this way, the first device is registered with the service provider. In another example, the user account is the entity user account. In this case, upon determining the association between the user identifier and the service provider user account, the service provider computer system sends the unique device data to the provisioner and/or the entity computer system. In turn, the provisioner and/or the entity computer system store an association between such data and the entity user account. In this way, the first device is registered with the entity.

Figure 10:
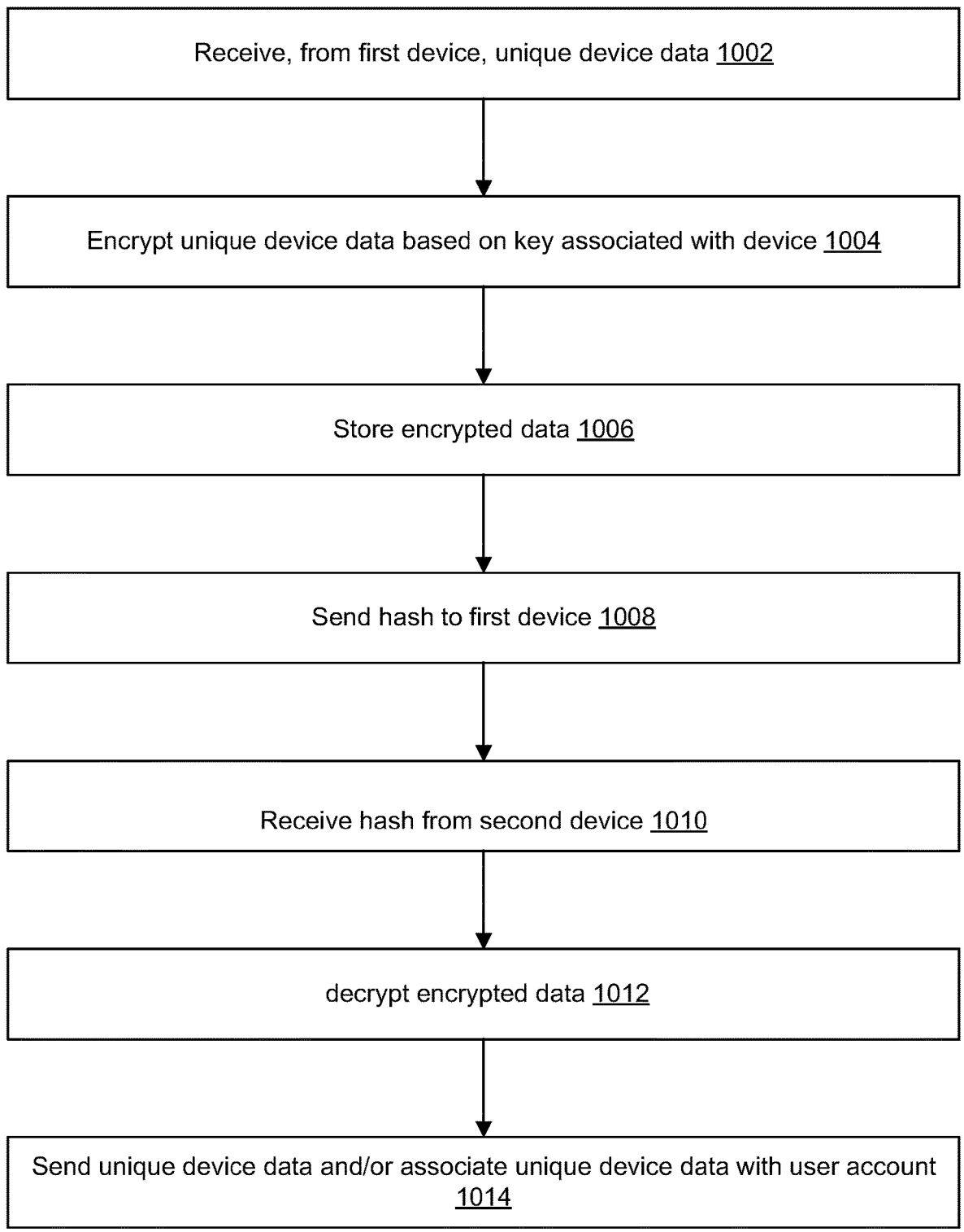
FIG. 10 illustrates an example of a flow for using a hash to associate a device with a user account, according to an embodiment of the present disclosure.

FIG. 10 illustrates an example of a flow for using a hash to associate the first device with the user account, according to an embodiment of the present disclosure. Rather than sending the unique device data, the hash is used for the device registration.

In an example, the flow may start at operation 1002, where the service provider computer system receives, from the first device, the unique device data. In an example, the unique device data is received upon a determination that the first device has not been associated with the user account yet. Such determination may be performed locally by the first device and/or remotely by the second device (e.g., upon a query of devices added to the secure network), the service provider computer system (e.g., upon a determination that the unique device data has not been associated with the service provider user account despite the fact that the first device has joined the secure network), or the entity service provider (e.g., upon a query from the service computer system once the first device has joined the secure network).

At operation 1004, the service provider computer system encrypts the unique device data based on a key associated with the first device. In an example, the key is a symmetric key that is shared between the service provider computer system and the first device and that was generated to establish the data connection of the first device to the secure network. In another example, the key is a public key corresponding to a private key of the computer system, where the public key and private key pair is associated with a family of device types available from the entity. Given the digital certificate data, the computer system determines the device type and the family to then determine the public key for the encryption.

At operation 1006, the service provider computer system stores the encrypted data in a data store. In addition, the computer system can generate a hash of the unique device data. The data store can further store an association between the hash and the encrypted data.

At operation 1008, the service provider computer system sends the hash to the first device. The first device can set-up control bits to use the hash in a Wi-Fi beacon or an authenticated flag to use the hash in a Bluetooth beacon.

At operation 1010, the service provider computer system receives the hash from the second device. For instance, the hash is received in response to the Wi-Fi beacon or Bluetooth beacon from the first device.

At operation 1012, the service provider computer system decrypts the encrypted data based on the hash. For instance, the service provider computer system uses the hash to look-up the data store and, based on the stored association to the encrypted data, retrieves the encrypted data. The encrypted data is then decrypted with the symmetric key or the private key of the computer system as applicable.

At operation 1014, the service provider computer system sends the unique device data to the second device and/or the entity computer system for a registration of the first device with the entity. Additionally or alternatively, the service provider computer system associates the unique device data with the service provider user account for a registration of the first device with the service provider.

Figure 11:
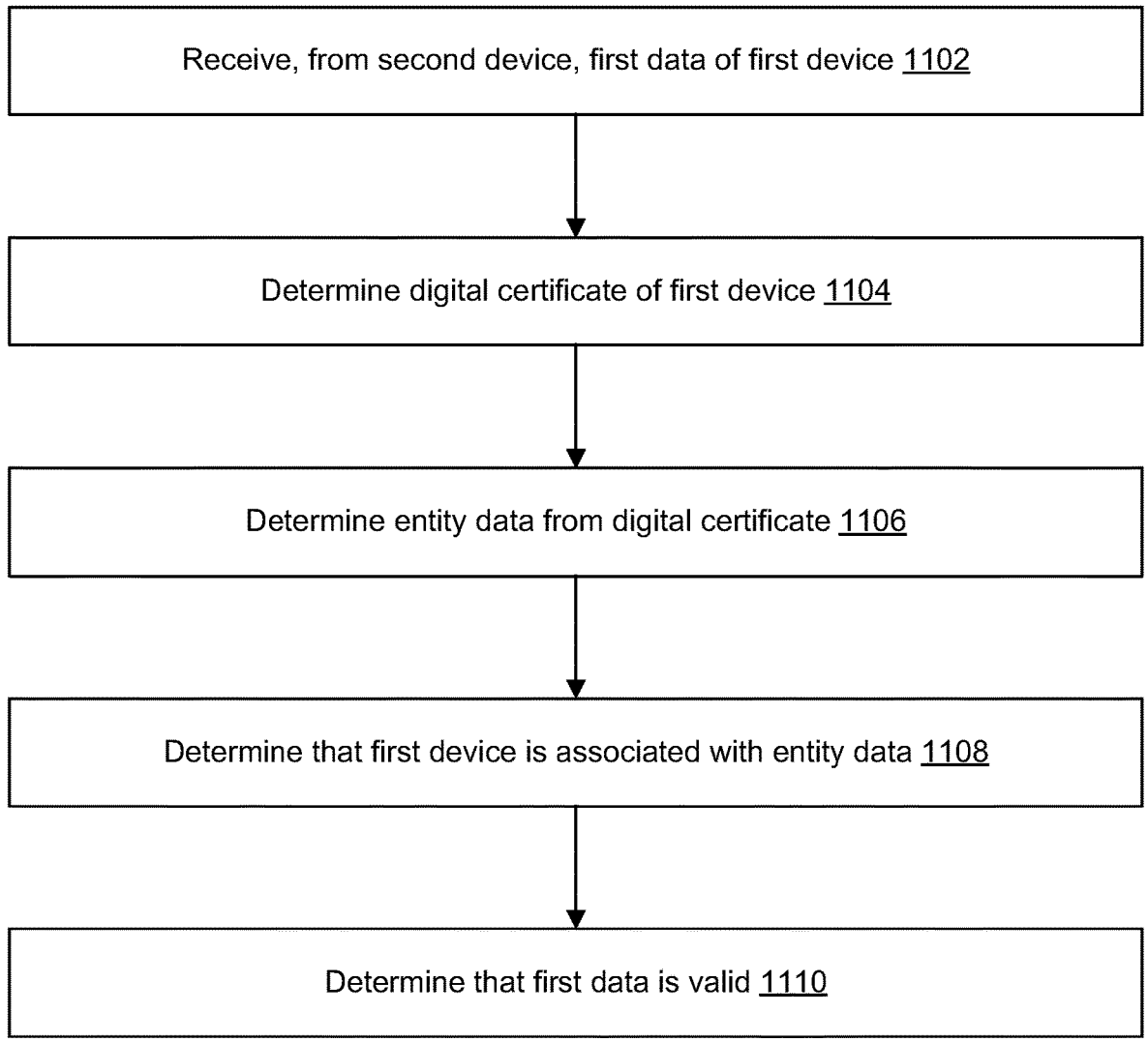
FIG. 11 illustrates an example of a flow for determining that data requesting an association is valid, according to an embodiment of the present disclosure.

FIG. 11 illustrates an example of a flow for determining that data requesting an association is valid, according to an embodiment of the present disclosure. In an example, the flow may start at operation 1102, where the service provider computer system receives, from the second device, the first data of the first device indicating the request for the association. For instance, the first data is received based on a beacon from the first device to the second device. However, other techniques for requesting the association are also possible and the validation of such requests follows a similar flow.

At operation 1104, the service provider computer system determines a digital certificate of the first device. In an example, the digital certificate is available from the initial data connection set-up.

At operation 1106, the service provider computer system determines entity data from the digital certification. In an example, the digital certification includes data associated with the entity, such as data identifying the entity and/or the device type.

At operation 1108, the service provider computer system determines that the first device is associated with the entity data. In an example, the computer system determines that a match exists between the first device and the entity, such as by determining that the first device is of the same type as the device type available from the entity.

At operation 1110, the service provider computer system determines that the first data is valid. In an example, the first data is validated based on the match.

The use of the digital certificate is one example of a parameter to validate the first data. However, the use of other parameters is also possible. These parameters can be defined according to input of the service provider and/or entity. For instance, and as described in connection with FIG. 8, the input specifies that a particular type of the first data and/or particular content of the first data (e.g., a signature, or unique identifier of the provisionee, provisionee's device type, and/or the entity) are needed. In this case, the first data is validated by, additionally or alternatively, determining if the first data is of the particular type and/or includes the particular content.

Figure 12:
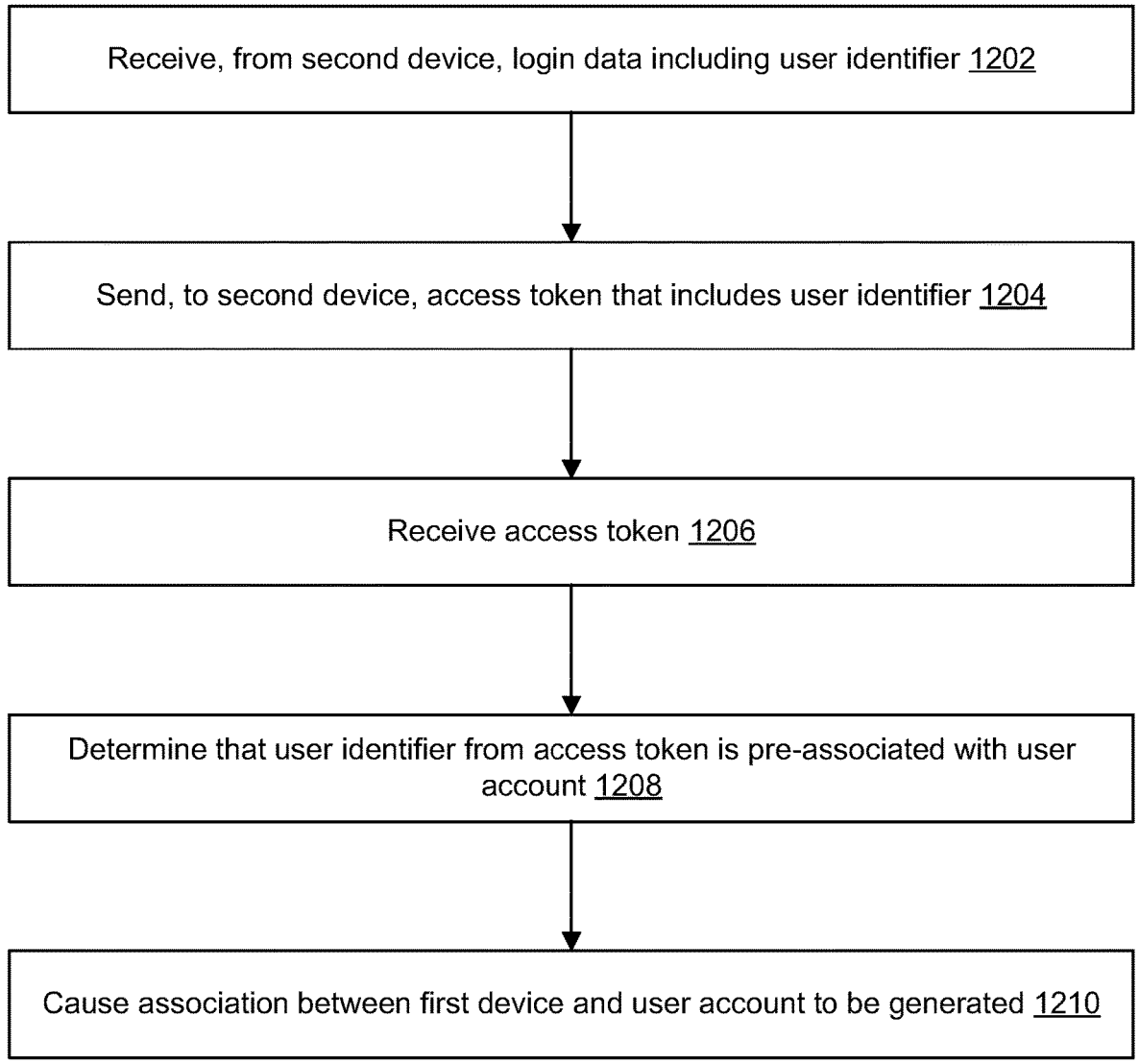
FIG. 12 illustrates an example of a flow for a user authentication, according to an embodiment of the present disclosure.

FIG. 12 illustrates an example of a flow for a user authentication, according to an embodiment of the present disclosure. The user authentication involves the use of an access token that encodes the user identifier.

In an example, the flow may start at operation 1202, where the service provider computer system receives, from the second device, login data that includes the user identifier. In an example, the login data is received from the service provider application or the entity application upon a validation of the first data requesting the association of the first device with the user account.

At operation 1204, the service provider computer system sends, to the second device, the access token that includes the user identifier. For instance, and as illustrated in connection with FIG. 3, the access token can be sent by a first computing service of the service provider computer system (E.g., Smart Home Cloud). Although operations 1202 and 1204 are described in connection with a same second device, additional or different devices can be involved in these operations. For instance, at operation 1204, the service provider can send the access token to a third device other than the second device. In this case, the subsequent operations can be performed in connection with the third device.

At operation 1206, the service provider computer system computer system receives the access token. For instance, and as illustrated in connection with FIG. 3, the access token can be received by a second computing service of the service provider computer system (e.g., DSS).

At operation 1208, the service provider computer system determines that the user identifier from the access token is pre-associated with the service provider computer system. For instance, and as illustrated in connection with FIG. 3, the second computing service determines that an association between the user identifier and the service provider user account already exists.

At operation 1210, the service provider computer system causes the association between the first device and the user account to be generated. For instance, the service computer system registers the first device with the service provider and/or sends the unique device data to the provisioner and/or entity computer system for the registration of the first device with the entity.

Figure 13:
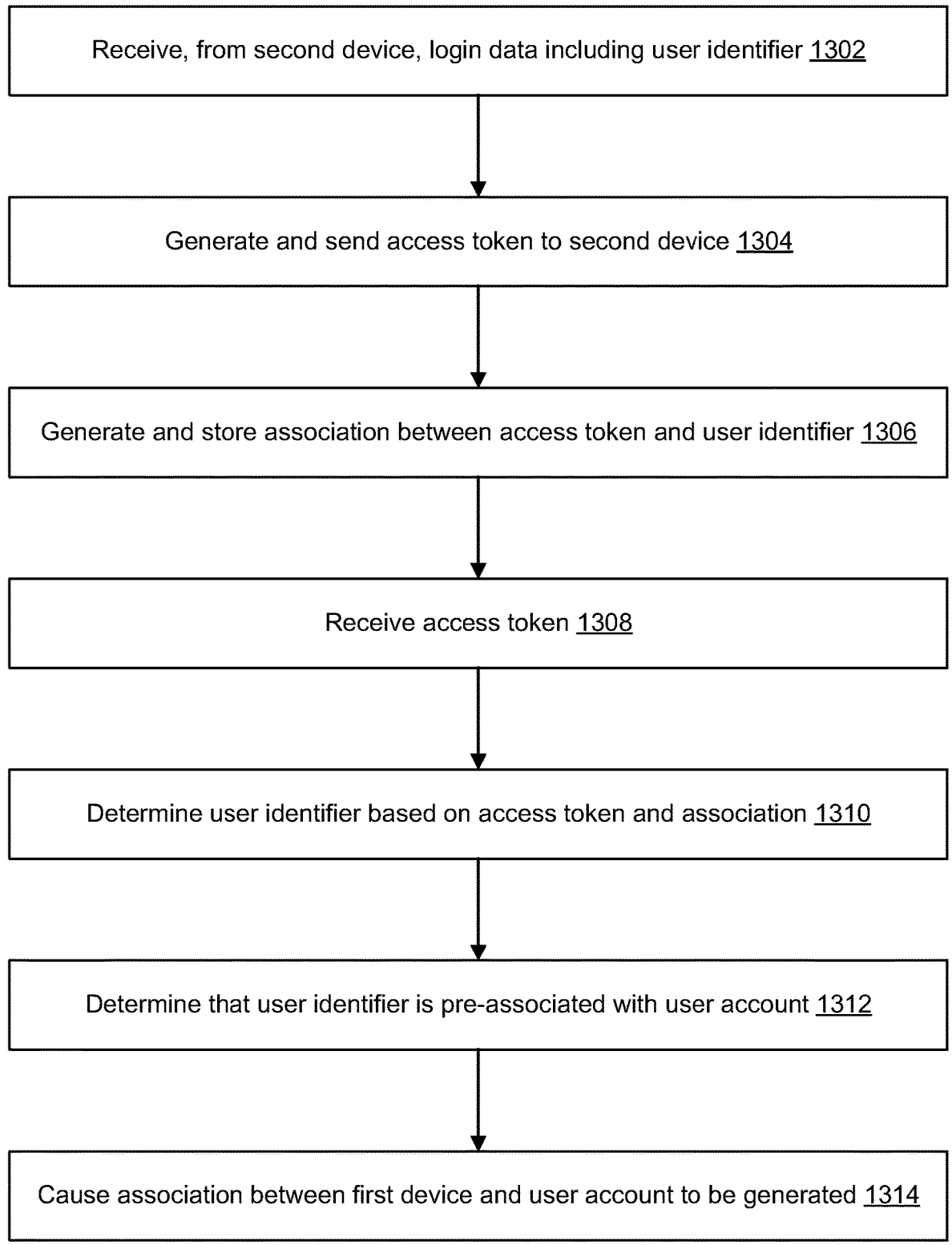
FIG. 13 illustrates another example of a flow for a user authentication, according to an embodiment of the present disclosure.

FIG. 13 illustrates another example of a flow for a user authentication, according to an embodiment of the present disclosure. The user authentication involves the use of an access token that does not include the user identifier, but that is associated with the user identifier.

In an example, the flow may start at operation 1302, where the service provider computer system receives, from the second device, the login data that includes the user identifier.

At operation 1304, the service provider computer system generates the access token. In an example, the computer system generates random data and stores the random data in the access token. In other words, the access token does not include data specific to the user.

At operation 1306, the service provider computer system generates and stores and association between the access token and the user identifier. For instance, the association is stored in a look-up table that lists the user identifier corresponding to the access or the random data in the token. Of course, rather than including the random data in the access token and/or look-up table, a hash of such data can be used.

At operation 1308, the service provider computer system receives the access token. For instance, the access token is received from the second device and/or from the entity computer system.

At operation 1310, the service provider computer system determines the user identifier based on the access token and the association stored in the data store. For instance, the access token (or the random data or the hash therein) is used to query the look-up table and retrieve the user identifier.

At operation 1312, the service provider computer system determines that the user identifier from the access token is pre-associated with the service provider computer system. For instance, service provider computer system determines that an association between the user identifier and the service provider user account already exists.

At operation 1314, the service provider computer system causes the association between the first device and the user account to be generated. For instance, the service computer system registers the first device with the service provider and/or sends the unique device data to the provisioner and/or entity computer system for the registration of the first device with the entity.

Figure 14:
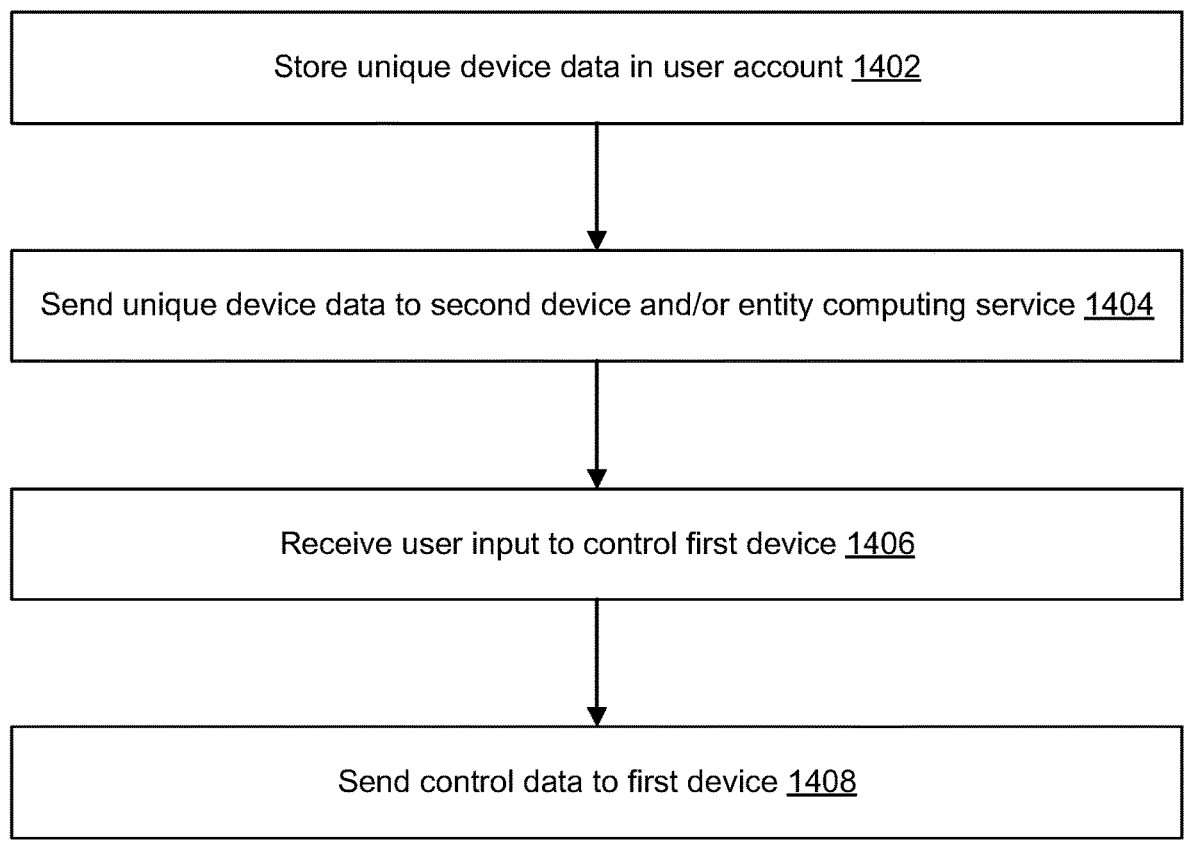
FIG. 14 illustrates yet another example of a flow for controlling a registered device, according to an embodiment of the present disclosure.

FIG. 14 illustrates yet another example of a flow for controlling the first device upon the registration, according to an embodiment of the present disclosure. In an example, the flow may start at operation 1402, where the service provider computer system stores the unique device data in the service provider user account. In an example, the unique device data may have been encrypted either by the first device (if the first data includes the unique device data) or by the service provider computer system (if the first data includes a hash instead). Accordingly, the user may rely on the service provider application executing on the second device (e.g., a smartphone) to access the service provider user account and receive a list of devices that have been registered under the service provider user account.

At operation 1404, the service provider computer system sends the unique device data to the second device and/or the entity computer system. In an example, the unique device data can be decrypted, as applicable, prior to being sent. The second device and/or the entity computer system stores the unique device data in the entity user account. Accordingly, the user may rely on the entity application executing on the second device (e.g., the smartphone) to access the entity user account and receive a list of devices that have been registered under the entity user account.

At operation 1406, the service provider computer system receives user input to control the first device. The user input can be received from the second user device based on the service provider application or the entity application, another device on the secure network, and/or the entity computer system. The user input may include data about the first device and a requested control (e.g., power off a smart plug).

At operation 1408, the service provider computer system sends control data to the first device in response to the user input. For instance, the service provider computer system identifies the first device from the service provider user account and sends the control data to the first device to perform the requested control.

Figure 15:
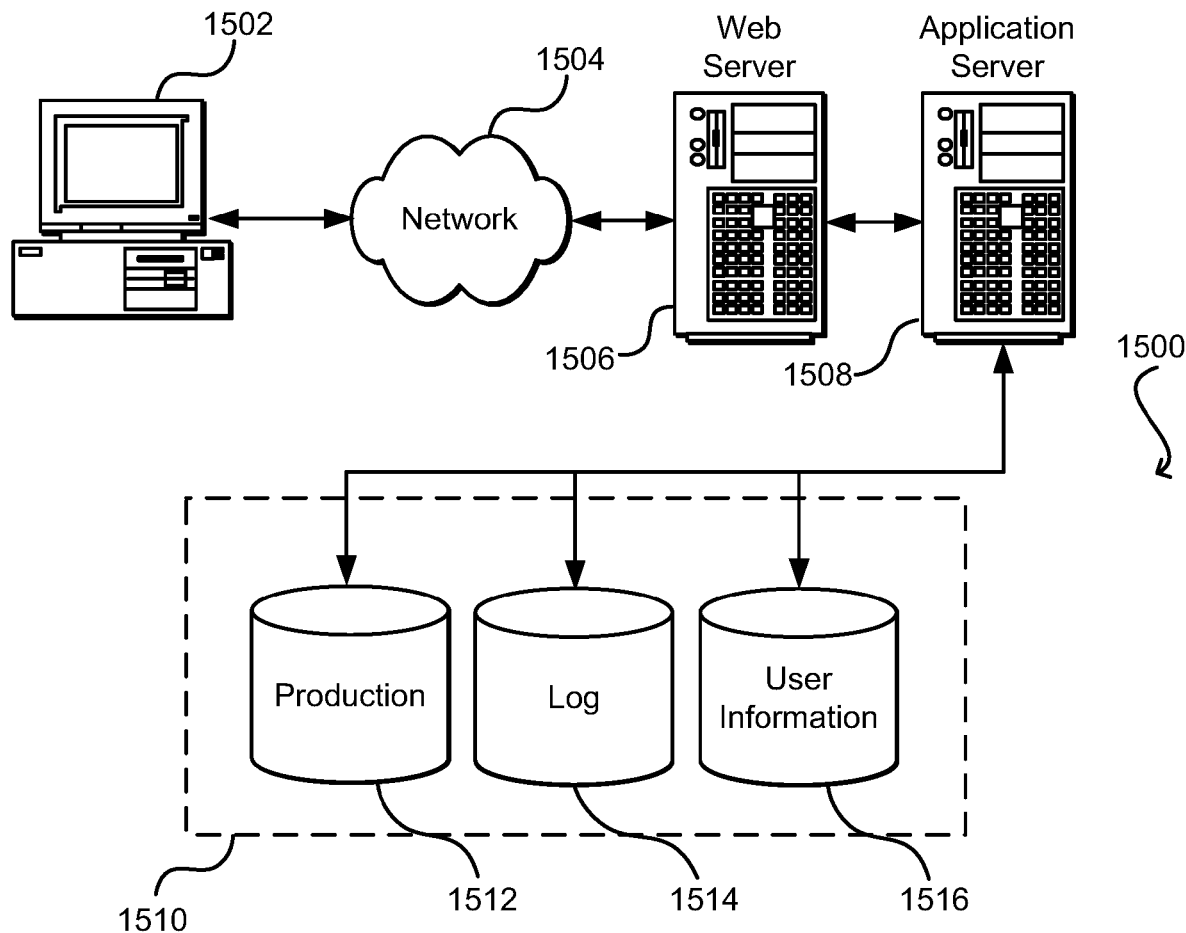
FIG. 15 illustrates a computer architecture diagram showing an example computer architecture, according to an embodiment of the present disclosure.

FIG. 15 illustrates a computer architecture diagram showing an example computer architecture, according to an embodiment of the present disclosure. This architecture may be used to implement some or all of the systems described herein. The computer architecture shown in FIG. 15 illustrates a server computer, workstation, desktop computer, laptop, tablet, network appliance, personal digital assistant ("PDA"), e-reader, digital cellular phone, or other computing device, and may be utilized to execute any aspects of the software components presented herein.

The computer 1500 includes a baseboard 1502, or "motherboard," which is a printed circuit board to which a multitude of components or devices may be connected by way of a system bus or other electrical communication paths. In one illustrative embodiment, one or more central processing units ("CPUs") 1504 operate in conjunction with a chipset 1506. The CPUs 1504 may be standard programmable processors that perform arithmetic and logical operations necessary for the operation of the computer 1500.

The CPUs 1504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1506 provides an interface between the CPUs 1504 and the remainder of the components and devices on the baseboard 1502. The chipset 1506 may provide an interface to a random access memory ("RAM") 1508, used as the main memory in the computer 1500. The chipset 1506 may further provide an interface to a computer-readable storage medium such as a read-only memory ("ROM") 1510 or non-volatile RAM ("NVRAM") for storing basic routines that help to startup the computer 1500 and to transfer information between the various components and devices. The ROM 1510 or NVRAM may also store other software components necessary for the operation of the computer 1500 in accordance with the embodiments described herein.

The computer 1500 may operate in a networked environment using logical connections to remote computing devices and computer systems through a network, such as the local area network 1520. The chipset 1506 may include functionality for providing network connectivity through a NIC 1512, such as a gigabit Ethernet adapter. The NIC 1512 is capable of connecting the computer 1500 to other computing devices over the network 1520. It should be appreciated that multiple NICs 1512 may be present in the computer 1500, connecting the computer to other types of networks and remote computer systems.

The computer 1500 may be connected to a mass storage device 1518 that provides non-volatile storage for the computer. The mass storage device 1518 may store system programs, application programs, other program modules, and data, which have been described in greater detail herein. The mass storage device 1518 may be connected to the computer 1500 through a storage controller 1514 connected to the chipset 1506. The mass storage device 1518 may consist of one or more physical storage units. The storage controller 1514 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1500 may store data on the mass storage device 1518 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1518 is characterized as primary or secondary storage, and the like.

For example, the computer 1500 may store information to the mass storage device 1518 by issuing instructions through the storage controller 1514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1500 may further read information from the mass storage device 1518 by detecting the physical states or characteristics of one or more particular locations within the physical storage units.

In addition to the mass storage device 1518 described above, the computer 1500 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1500.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1518 may store an operating system 1530 utilized to control the operation of the computer 1500. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1518 may store other system or application programs and data utilized by the computer 1500. The mass storage device 1518 might also store other programs and data not specifically identified herein.

In one embodiment, the mass storage device 1518 or other computer-readable storage media is encoded with computer-executable instructions which, when loaded into the computer 1500, transforms the computer from a general-purpose computing system into a special-purpose computer capable of implementing the embodiments described herein. These computer-executable instructions transform the computer 1500 by specifying how the CPUs 1504 transition between states, as described above. According to one embodiment, the computer 1500 has access to computer-readable storage media storing computer-executable instructions which, when executed by the computer 1500, perform the various routines described above. The computer 1500 might also include computer-readable storage media for performing any of the other computer-implemented operations described herein.

The computer 1500 may also include one or more input/output controllers 1516 for receiving and processing input from a number of input devices, such as a keyboard, a mouse, a touchpad, a touch screen, an electronic stylus, or other type of input device. Similarly, the input/output controller 1516 may provide output to a display, such as a computer monitor, a flat-panel display, a digital projector, a printer, a plotter, or other type of output device. It will be appreciated that the computer 1500 may not include all of the components shown in FIG. 15, may include other components that are not explicitly shown in FIG. 15, or may utilize an architecture completely different than that shown in FIG. 15. It should also be appreciated that many computers, such as the computer 1500, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer system of a service provider, the computer system comprising:
    one or more processors; and
    one or more memories storing computer-readable instructions that, upon execution by the one or more processors, configure the computer system to:
        send instructions to a first computing device to establish a connection to a secure local area network (LAN);
        receive, from a second computing device of the secure LAN, first data of the first computing device, the first data indicating a device identifier of the first computing device and a first request for a first association between the first computing device and a user account, the first data being received based on a data connection established between the first computing device and the secure LAN and on the first association not already generated;
        determine second data associating an entity with a plurality of computing devices;
        determine that the first data is valid based on the second data indicating an association between the device identifier and the entity;
        send, to the second computing device after the determining that the first data is valid, a second request to initiate, by the second computing device, a user authentication, the user authentication to be initiated based on the association between the device identifier and the entity;
        receive, from the second computing device, a user identifier based on the user authentication;
        determine that the user identifier is pre-associated with the user account based on a second association; and
        send, to the second computing device based on the second association, third data to cause the first association between the first computing device and the user account.

2. The computer system of claim 1, wherein the first data is received based on a beacon of the first computing device and comprises the device identifier and a device type that are encrypted in the beacon based on a public key of the computer system, wherein the one or more memories store further computer-readable instructions that, upon execution by the one or more processors, additionally configure the computer system to decrypt the device identifier and the device type based on a private key of the computer system, and wherein the third data comprises the device identifier and the device type that are decrypted.

3. The computer system of claim 1, wherein the user account is a first user account associated with the entity, wherein the second request comprises instructions for a user to login to a second user account via an application associated with the entity, wherein the second user account is associated with the service provider, and wherein the user identifier is received based on a user login.

4. A method implemented by a computer system, the method comprising:
sending instructions to a first device to establish a connection to a secure network;
receiving, from a second device connected to the secure network, first data of the first device, the first data indicating a device identifier of the first device and a request for a first association between the first device and a user account, the first data received based on the first association not already generated;
determining second data associating an entity with a plurality of devices;
determining that the first data is valid based on the second data indicating an association between the device identifier and the entity;
sending, to the second device after the determining that the first data is valid, third data to initiate, by the second device, a user authentication, the user authentication to be initiated based on the association between the device identifier and the entity;
receiving, from the second device, a user identifier based on the user authentication;
determining that a second association between the user identifier and the user account exists; and
causing the first association between the first device and the user account to be generated based on the second association.

5. The method of claim 4, further comprising:
prior to receiving the first data, sending the instructions to the first device to establish a data connection to the secure network, wherein the first data is received further based on the data connection being established.

6. The method of claim 5, wherein determining that the first data is valid comprises:
determining a device type and an entity identifier from a digital certificate of the first device, wherein the second data comprises the device type and the entity identifier; and
determining that the first data is associated with the device type and the entity identifier, wherein the first data is determined to be valid is further based on the first data being associated with the device type and the entity identifier.

7. The method of claim 5, wherein receiving the first data comprises receiving a beacon response or a beacon request, and wherein the beacon response or the beacon request is sent from the first device to the second device over a data channel of a same type as the data connection.

8. The method of claim 5, wherein the first data is sent from the first device to the second device over a data channel of a different type than the data connection.

9. The method of claim 4, wherein the first data comprises encrypted data, and wherein causing the first association to be generated comprises sending the encrypted data to at least one of the second device or a computing service associated with the first device.

10. The method of claim 4, wherein the first data comprises the device identifier that is encrypted with a key associated with the computer system, and wherein causing the first association to be generated comprises:
decrypting the device identifier; and
associating the device identifier with the user account.

11. The method of claim 4, further comprising:
prior to receiving the first data, receiving, from the first device, fourth data unique to the first device;
storing the fourth data in a data store; and
sending a hash of the fourth data to the first device.

12. The method of claim 11, wherein receiving the first data comprises receiving the hash, and wherein causing the first association to be generated comprises:
determining, from the data store, the fourth data based on the hash; and
sending the fourth data to the second device.

13. The method of claim 4 further comprising:
decrypting, based on a private key of the computer system, at least a portion of the first data, wherein the portion is encrypted by the first device based on a public key of the computer system, and wherein the first data is determined to be valid is further based on the decrypting.

14. One or more non-transitory computer-readable storage media storing instructions that, upon execution by one or more processors of a system, cause the system to perform operations comprising:
sending instructions to a first device to establish a connection to a secure network;
receiving, from a second device connected to the secure network, first data of the first device, the first data indicating a device identifier of the first device and a request for a first association between the first device and a user account, the first data received based on the first association not already generated;
determining second data associating an entity with a plurality of devices;
determining that the first data is valid based on the second data indicating an association between the device identifier and the entity;
sending, to the second device after the determining that the first data is valid, third data to initiate, by the second device, a user authentication, the user authentication to be initiated based on the association between the device identifier and the entity;
determining a user identifier based on the user authentication;
determining that a second association between the user identifier and the user account exists; and
causing the first association between the first device and the user account to be generated based on the second association.

15. The one or more non-transitory computer-readable storage media of claim 14, wherein the first data is received based on an execution of an application on the second device, and wherein the operations further comprise:
sending, to the second device, an access token that comprises the user identifier; and
receiving, from the application, the access token, wherein the user identifier is determined from the access token.

16. The one or more non-transitory computer-readable storage media of claim 14, wherein the first data is received based on an execution of an application on the second device, and wherein the operations further comprise:
generating a third association between the user identifier and an access token;
storing the third association in a data store;
sending, to the second device, the access token; and
receiving the access token from the application, wherein the user identifier is determined from the data store based on the access token and the third association.

17. The one or more non-transitory computer-readable storage media of claim 14, wherein sending the third data comprises sending instructions to the second device for a user login to the user account via an application executing on the second device, wherein the application is available from a computing service associated with the first device.

18. The one or more non-transitory computer-readable storage media of claim 14, wherein the first data comprises unique device data, wherein determining the user identifier comprises receiving the user identifier from at least one of the second device or a computing service associated with the first device, and wherein causing the first association to be generated comprises sending the unique device data to at least one of the second device or the computing service.

19. The one or more non-transitory computer-readable storage media of claim 14, wherein the first data comprises unique device data, wherein causing the first association to be generated comprises including the unique device data in the user account.

20. The one or more non-transitory computer-readable storage media of claim 14, wherein the first data comprises unique device data, wherein causing the first association to be generated comprises:
    sending the unique device data to at least one of a computing service associated with the first device or the second device, wherein the first association is generated by the at least one of the computing service or the second device based on the unique device data.

* * * * *